US012687815B2

(12) United States Patent
Liu et al.

(10) Patent No.: US 12,687,815 B2
(45) Date of Patent: Jul. 21, 2026

(54) CROWN ASSEMBLY AND WEARABLE DEVICE

(71) Applicant: HUAWEI TECHNOLOGIES CO., LTD., Shenzhen (CN)

(72) Inventors: Xiaogang Liu, Xi'an (CN); Fangfang Li, Xi'an (CN); Zhiwei Liu, Xi'an (CN); Yanming Ren, Dongguan (CN); Jinchao Gong, Xi'an (CN); Shifeng Fu, Xi'an (CN); Weixin Huang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 248 days.

(21) Appl. No.: 18/291,110

(22) PCT Filed: Jul. 28, 2022

(86) PCT No.: PCT/CN2022/108582
§ 371 (c)(1),
(2) Date: Jan. 22, 2024

(87) PCT Pub. No.: WO2023/006025
PCT Pub. Date: Feb. 2, 2023

(65) Prior Publication Data

US 2025/0093816 A1 Mar. 20, 2025

(30) Foreign Application Priority Data

Jul. 30, 2021 (CN) ......................... 202110872313.6

(51) Int. Cl.
*G04B 3/04* (2006.01)
*G04G 17/00* (2013.01)
(Continued)

(52) U.S. Cl.
CPC ............. *G04B 3/046* (2013.01); *G04G 21/00* (2013.01); *G04G 21/08* (2013.01); *G04G 17/00* (2013.01)

(58) Field of Classification Search
None
See application file for complete search history.

(56) References Cited

U.S. PATENT DOCUMENTS

2019/0072912 A1* 3/2019 Pandya ................ G04G 21/025
2020/0073339 A1* 3/2020 Roach ..................... G06F 1/163
2021/0373501 A1* 12/2021 Pandya .................. A61B 5/282

FOREIGN PATENT DOCUMENTS

CN 102917093 A 2/2013
CN 209928225 U 1/2020
(Continued)

OTHER PUBLICATIONS

International Search Report and Written Opinion in International Appln. No. PCT/CN2022/108582, mailed on Sep. 29, 2022, 15 pages (with English translation).
(Continued)

*Primary Examiner* — Regis J Betsch
*Assistant Examiner* — Michael James Walker
(74) *Attorney, Agent, or Firm* — Fish & Richardson P.C.

(57) ABSTRACT

An example crown assembly includes a button tube, a crown, a spring piece, a switch, and a fastening frame. The crown includes a crown cap and a crown stem that are connected. The spring piece includes a first plate, an elastic arm, and a second plate. Two ends of the elastic arm are connected to the first plate and the second plate. When pressure is exerted on the crown cap, the crown stem is capable of moving along the axis and pushing the first plate away from the end that is of the elastic arm and is connected to the second plate, to enable the first plate to press the switch. The elastic arm is capable of generating elastic
(Continued)

deformation, and when the pressure on the crown cap is released, the first plate is capable of pushing the crown stem away from the switch under elasticity of the elastic arm.

20 Claims, 16 Drawing Sheets

(51) Int. Cl.
*G04G 21/00* (2010.01)
*G04G 21/08* (2010.01)

(56) References Cited

FOREIGN PATENT DOCUMENTS

| | | | |
|---|---|---|---|
| CN | 111830818 | A | 10/2020 |
| WO | 2021002575 | A1 | 1/2021 |

OTHER PUBLICATIONS

Office Action in European Appln. No. 22848630.4, mailed on Oct. 29, 2024, 8 pages.

* cited by examiner

CROWN ASSEMBLY AND WEARABLE DEVICE

CROSS-REFERENCE TO RELATED APPLICATIONS

This application is a national stage of International Application No. PCT/CN2022/108582, filed on Jul. 28, 2022, which claims priority to Chinese Patent Application No. 202110872313.6, filed on Jul. 30, 2021. Both of the aforementioned applications are incorporated herein by reference in their entirety.

TECHNICAL FIELD

This application relates to the field of electronic devices, and in particular, to a crown assembly and a wearable device having the crown assembly.

BACKGROUND

A wearable device (for example, a smartwatch) has a crown that can be pressed and rotated. A corresponding function may be implemented by pressing or rotating the crown. A conventional smartwatch uses a spring to provide pressing resilience. The spring is disposed in a crown cap of the crown. When the crown is rotated, the crown cap and an end of the spring rub. This easily causes abnormalities such as crown jamming, abnormal noise, and a large deviation of forward rotation/reverse rotation damping. Consequently, user experience is affected.

SUMMARY

Embodiments of this application provide a crown assembly and a wearable device having the crown assembly, to resolve problems of crown jamming, abnormal noise, and a large deviation of forward rotation/reverse rotation damping caused by using a spring in a conventional wearable device.

According to a first aspect, an embodiment of this application provides a crown assembly. The crown assembly is configured to be disposed in a wearable device to implement a crown function. The wearable device includes a case. The crown assembly includes a button tube, a crown, a spring piece, a switch, and a fastening frame. The button tube and the fastening frame are configured to be disposed in the case. The crown includes a crown cap and a crown stem that are connected. The crown stem has a contact end away from the crown cap. The crown stem passes through an inner cavity of the button tube, the crown stem is rotatably connected to a cavity wall of the inner cavity and can move along an axis of the crown stem in the inner cavity. The contact end and the crown cap are exposed at two opposite ends of the button tube. The spring piece includes a first plate, an elastic arm, and a second plate. Two ends of the elastic arm are respectively connected to the first plate and the second plate. The second plate is configured to dispose the spring piece on the fastening frame. One end that is of the elastic arm and that is connected to the second plate, and the other end that is of the elastic arm and that is connected to the first plate are respectively located on two sides of an end surface of the contact end. One side of the first plate is close to the switch. The other side of the first plate is in contact with the end surface of the contact end. The switch is disposed on the fastening frame and is located on a side that is of the first plate and that faces away from the contact end. When pressure is exerted on the crown cap, the crown stem can move along the axis and push the first plate away from the end that is of the elastic arm and that is connected to the second plate, to enable the first plate to press the switch, where the elastic arm can generate elastic deformation. When the pressure on the crown cap is released, the first plate can push the crown stem away from the switch under elasticity of the elastic arm.

In this embodiment of this application, the crown stem and the inner cavity of the button tube form rotational fitting and sliding fitting. The button tube can carry the crown stem. The contact end is an entity part that is of the crown stem and that is away from the crown cap. A normal line of the end surface of the contact end is substantially perpendicular to the axis of the crown stem. The second plate of the spring piece may be fastened to the fastening frame, so that the spring piece is disposed on the fastening frame. The first plate of the spring piece is configured to press the switch. The second plate is connected to the first plate via the elastic arm of the spring piece. Two opposite ends of the elastic arm are respectively located on two sides of the end surface of the contact end. When a user presses the crown cap, the spring piece extends.

In this embodiment of this application, because the crown can smoothly rotate forward and reverse in the inner cavity of the button tube, and friction damping of forward rotation is consistent with that of reverse rotation, abnormalities such as crown jamming, a large deviation of forward rotation/reverse rotation damping, and abnormal noise in a conventional solution of using a spring are avoided. This can greatly improve user experience.

In addition, because the spring piece may be located inside the case, and is far away from the crown cap, it is difficult for external water vapor and dust to enter the spring piece through a gap between the crown cap and the case. Therefore, in the solution in this embodiment of this application, external erosion on the spring piece can be avoided, to ensure reliability of the spring piece. In addition, the crown stem of the crown and the button tube have a large fitting length, and the button tube has a significant limiting effect on the crown stem, so that the crown is not easy to shake.

In an implementation of the first aspect, the spring piece includes two elastic arms. An interval exists between two elastic arms. The interval is for the contact end to pass through, to enable the end surface of the contact end to be in contact with the first plate. The first plate is connected between the two elastic arms. The second plate is connected to the two elastic arms. The double elastic arms are designed to provide sufficient elasticity and optimize a pressing feeling of the crown assembly. The contact end of the crown stem passes through an interval of the elastic arm. This can reduce space, and facilitate a compact design of the wearable device.

In an implementation of the first aspect, the second plate and the elastic arm form a bending angle. The first plate is located within the bending angle. The spring piece has sufficient elasticity, a compact structure, easy installation, and can adapt to internal structural space of the wearable device.

In an implementation of the first aspect, the second plate has a positioning hole. The fastening frame has a heat stake. The heat stake passes through the positioning hole and is fitted with an edge of the positioning hole. A hot melt fastening manner is simple in design and manufacture, and has a reliable connection.

In an implementation of the first aspect, the spring piece includes a third plate. The third plate is connected to an end that is of the first plate and that is away from the elastic arm. The third plate and the first plate form a bending angle. The third plate is inclined in a direction facing away from the contact end.

In this implementation, the button tube and the crown may be first disposed on the case of the wearable device. Then, the fastening frame on which the spring piece is disposed is disposed on the case. In a process of positioning the spring piece in the installation position of the spring piece along positioning, because the third plate of the spring piece is inclined in the direction facing away from the contact end, movement of the spring piece can be guided. This reduces a risk that the spring piece is stuck by the contact end, and ensures that the spring piece can smoothly fit with the contact end.

In an implementation of the first aspect, the elastic arm includes a first arm and a second arm. Two ends of the first arm are respectively connected to the second plate and the second arm. Two ends of the second arm are respectively connected to the first arm and the first plate. The first arm and the first plate are stacked at an interval. The first arm and the first plate are respectively located on the two sides of the end surface of the contact end. The elastic arm has sufficient elasticity, simple structure, and good mass production performance.

In an implementation of the first aspect, the second arm is bent. Parts that are of the second arm and that are connected in a bending manner are not coplanar. In this implementation, the second arm may include several flat structures. These flat structures are sequentially connected and form bending angles. Alternatively, the second arm may be bent as a whole, for example, arcuate.

In an implementation of the first aspect, the second arm includes a first flat part and a second flat part. The first flat part is connected to the second flat part in a bending manner. An end that is of the first flat part and that is away from the second flat part is connected to the first plate. An end that is of the second flat part and that is away from the first flat part is connected to the first arm in a bending manner. The spring piece of this structure has sufficient elasticity, simple structure, and good mass production performance.

In an implementation of the first aspect, the second arm includes a first flat part, a first bent plate part, a second flat part, and a second bent plate part. The first flat part, the second flat part, and the first arm are sequentially stacked at intervals. The first bent plate part and the second bent plate part are respectively located at two opposite ends of the second flat part. The first bent plate part is connected to the first flat part and the second flat part. An end that is of the first flat part and that is away from the first bent plate part is connected to the first plate. The second bent plate part is connected to the second flat part and the first arm. The spring piece of this structure has sufficient elasticity, simple structure, and good mass production performance.

In an implementation of the first aspect, the crown assembly includes a nut. The nut is threadedly connected to the contact end of the crown stem. An end part of the contact end is exposed from the nut. The nut is in contact with an end surface of the button tube. An outer diameter of an end that is of the nut and that is in contact with the button tube is greater than an outer diameter of an end that is of the button tube and that is in contact with the nut, to prevent the crown stem from being detached from the button tube. The crown stem is limited via the nut. The connection is reliable, and the design and manufacture is simple.

In an implementation of the first aspect, the contact end includes a contact part and a threaded part that are connected. An outer diameter of the contact part is smaller than an outer diameter of the threaded part. The contact part is in contact with the first plate. The threaded part is threadedly connected to the nut. An end surface that is of the nut and that is close to the contact part is welded with an end surface that is of the threaded part and that is close to the contact part. A connection between the nut and the crown stem can be enhanced through welding, to eliminate a risk that the crown stem is detached from the button tube.

In a conventional product, a wrapper structure is used to wrap an end part of a crown stem. The end part of the crown stem is not exposed. The wrapper structure is in contact with a first plate of a spring piece. There is glue in the wrapper, and the wrapper structure is bonded to the end part of the crown stem to avoid separation of the crown stem from the button tube. This design is difficult to accurately control an amount of glue during manufacturing, the glue is easy to overflow or be insufficient, and the glue is easy to fail at high temperature. In this implementation, the design of the nut and the crown stem uses thread connection in combination with welding, so that process stability and process precision are high, and the connection is more reliable.

In an implementation of the first aspect, a wear-resistant lubricating layer is disposed an end surface of the end that is of the nut and that is in contact with the button tube; and/or a wear-resistant lubricating layer is disposed on an end surface of the end that is of the button tube and that is in contact with the nut. Hardness of the wear-resistant lubricating layer is greater than or equal to HV1000. Roughness is less than or equal to Ra0.2. In this implementation, the nut can rotate with the crown stem relative to the button tube. The wear-resistant lubricating layer is designed to enhance wear resistance of the nut and/or the button tube and reduce friction between the nut and the button tube.

In an implementation of the first aspect, the crown assembly includes a sensor. The sensor and the nut are disposed at an interval. The sensor is configured to detect a rotation direction and a rotation angle of the nut. In this implementation, both the sensor and the nut are separate components. This split design can reduce design difficulty and reduce costs.

In an implementation of the first aspect, the crown assembly includes a wear-resistant frame. Material hardness of the wear-resistant frame is greater than or equal to HV1000. The wear-resistant frame includes a bottom wall and a peripheral side wall that are connected. The peripheral side wall is protruded at a peripheral edge of the bottom wall. A central through hole is disposed on the bottom wall. The crown stem passes through the central through hole. Both the bottom wall and the peripheral side wall are fastened to an inner wall of the crown cap. The peripheral side wall is located between the button tube and the inner wall of the crown cap.

In this implementation, the button tube is close to the inner wall of the crown cap. Because a processing error or an assembly error, the button tube may be in contact with the inner wall of the crown cap, and friction is generated. After the wear-resistant frame is disposed between the inner wall of the button tube and the crown cap, friction and abnormal noise between the inner wall of the button tube and the crown cap can be avoided. In addition, after the wear-resistant frame is installed, the crown is not easy to shake along a radial direction of the crown. Therefore, assembly precision is improved, and user experience is ensured.

In an implementation of the first aspect, the button tube includes a connecting part and a fitting part. The connecting part has the inner cavity. The connecting part is configured to be fastened to the case. The fitting part is connected to an outer periphery of the connecting part in a surrounding manner and is located at an end that is of the connecting part and that is away from the nut. The peripheral side wall of the wear-resistant frame is located between the fitting part and the inner wall of the crown cap. The button tube has a simple structure, good mass production performance, and high fitting precision with another component.

In an implementation of the first aspect, a wear-resistant lubricating layer is disposed on a surface that is of the fitting part and that faces the peripheral side wall. Hardness of the wear-resistant lubricating layer is greater than or equal to HV1000. Roughness is less than or equal to Ra0.2. The wear-resistant lubricating layer is designed to enhance the wear resistance of the button tube and reduce friction between the button tube and the wear-resistant frame.

In an implementation of the first aspect, an installation groove is disposed on a surface of a part that is of the crown stem and that is located in the inner cavity. The installation groove surrounds the axis of the crown stem. The crown assembly includes a first sealing ring. The first sealing ring is disposed in the installation groove and is in contact with an inner wall of the inner cavity. The first sealing ring is designed to reduce or avoid a case in which external water vapor enters the case from the crown cap.

In an implementation of the first aspect, a wear-resistant lubricating layer is disposed on the end surface of the contact end; and/or a wear-resistant lubricating layer is disposed on a surface that is of the first plate and that is in contact with the contact end. Hardness of the wear-resistant lubricating layer is greater than or equal to HV1000. Roughness is less than or equal to Ra0.2. The wear-resistant lubricating layer is designed to enhance wear resistance of the crown stem and/or the spring piece, and reduce friction between the crown stem and the spring piece.

According to a second aspect, an embodiment of this application provides a crown assembly. The crown assembly is configured to be disposed in a wearable device to implement a crown function. The wearable device includes a case. The crown assembly includes a button tube, a crown, a nut, a spring piece, a switch and a fastening frame. The button tube and the fastening frame are configured to be disposed in the case. The crown includes a crown cap and a crown stem that are connected. The crown stem has a contact end away from the crown cap. The crown stem passes through an inner cavity of the button tube, the crown stem is rotatably connected to a cavity wall of the inner cavity and can move along an axis of the crown stem in the inner cavity. The contact end and the crown cap are exposed at two opposite ends of the button tube. The nut is threadedly connected to the contact end of the crown stem. An end part of the contact end is exposed from the nut. The nut is in contact with an end surface of the button tube. An outer diameter of an end that is of the nut and that is in contact with the button tube is greater than an outer diameter of an end that is of the button tube and that is in contact with the nut. The spring piece includes a first plate, an elastic arm, and a second plate. The elastic arm is connected between the first plate and the second plate. The second plate is fastened to the fastening frame. The elastic arm is bent. The first plate is in contact with the contact end of the crown stem. The switch is disposed on the fastening frame and is located on a side that is of the first plate and that faces away from the contact end. When pressure is exerted on the crown cap, the crown stem can move along the axis and push the first plate, to enable the first plate to press the switch, where the elastic arm can generate elastic deformation. When the pressure on the crown cap is released, the first plate can push the crown stem away from the switch under elasticity of the elastic arm.

In this embodiment of this application, because the crown can smoothly rotate forward and reverse in the inner cavity of the button tube, and friction damping of forward rotation is consistent with that of reverse rotation, abnormalities such as crown jamming, large deviation of forward rotation/reverse rotation damping, and abnormal noise in a conventional solution of using a spring are avoided. This can greatly improve user experience.

According to a third aspect, an embodiment of this application provides a wearable device, including a case and the foregoing crown assembly. The case has an installation hole. The installation hole communicates with an inner side and an outer side of the case. A button tube is fastened to an inner wall of the installation hole. Both a part of the button tube and a crown cap are located outside the case. Both a spring piece and a switch are located in the case.

A crown of the wearable device in this embodiment of this application can smoothly rotate forward and reverse. Friction damping of forward rotation is consistent with that of reverse rotation. There is no abnormal noise.

In an implementation of the third aspect, the installation hole is a threaded hole. The button tube is threadedly connected to the installation hole. An end surface that is of the button tube and that faces the spring piece is welded with an end surface that is of the installation hole and that faces the spring piece. The button tube can be reliably fastened to the case through thread connection and welding. This connection design has high process stability and process precision.

In an implementation of the third aspect, a gap exists between a part that is of the button tube and that is located outside the case and the case. The wearable device includes a second sealing ring. The second sealing ring is located in the gap and is in contact with both the button tube and the case. The second sealing ring may be in a compressed state, to act as a seal. The second sealing ring can be used to block a path through which external water vapor enters the case, to ensure working reliability of the crown assembly.

DESCRIPTION OF EMBODIMENTS

The following embodiment of this application provides a wearable device, including but not limited to a smartwatch, an electronic sphygmomanometer, a smart band, and the like. The following uses a smartwatch as an example for description.

Figure 1:
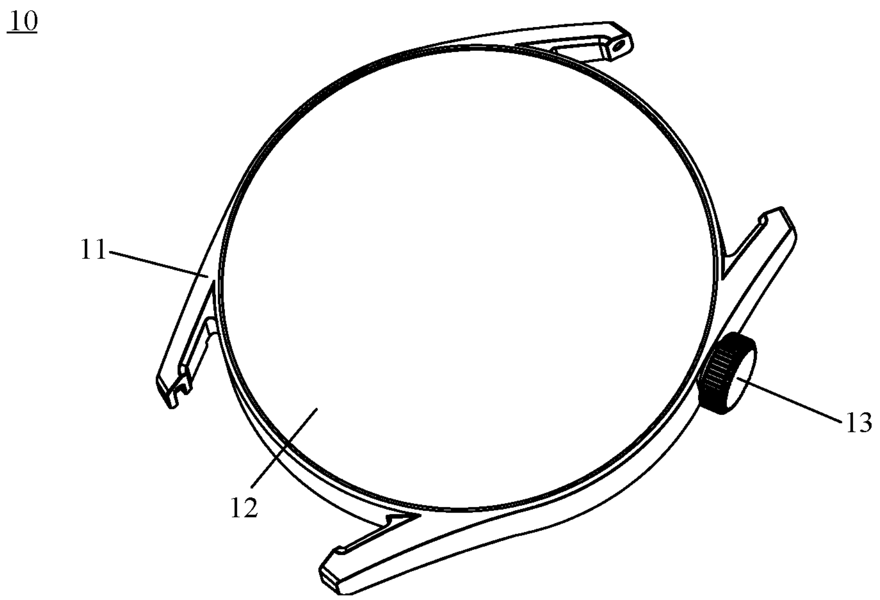
FIG. 1 is a schematic diagram of a three-dimensional structure of a wearable device according to an embodiment of this application.
Figure 2:
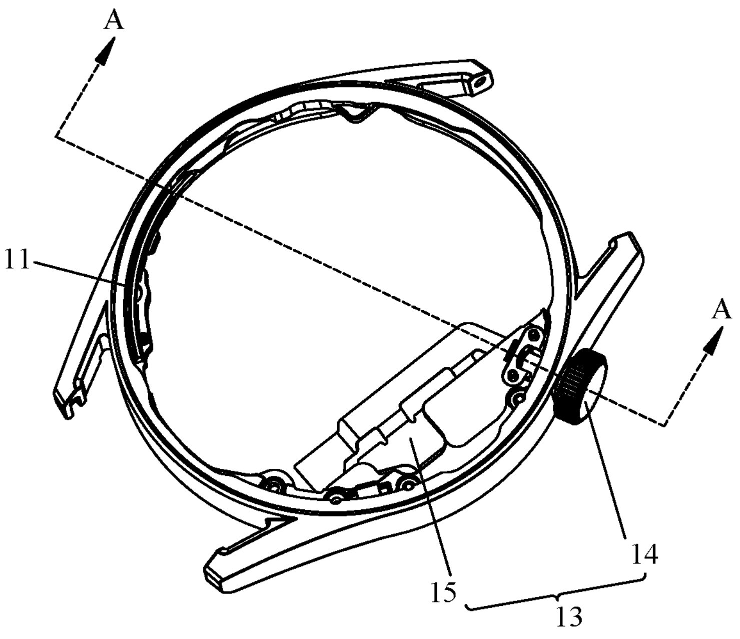
FIG. 2 is a schematic diagram of a partial structure of the wearable device in FIG. 1.

As shown in FIG. 1 and FIG. 2, a wearable device 10 in this embodiment of this application may include a case 11, a screen 12, and a crown assembly 13. Both the screen 12 and the crown assembly 13 are disposed on the case 11 (where FIG. 2 shows a structure shown in FIG. 1 without the screen 12).

Figure 3:
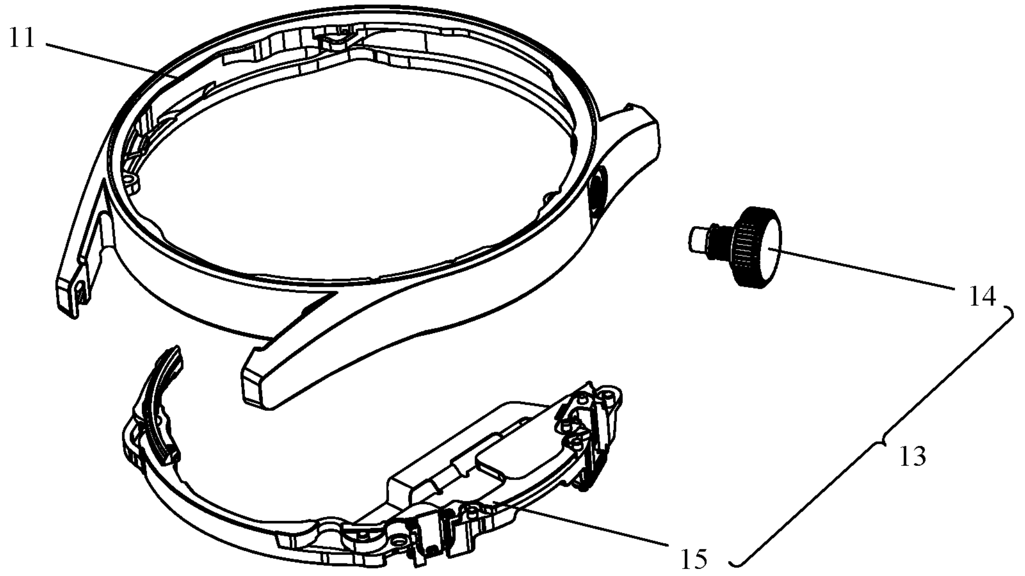
FIG. 3 is a schematic diagram of an exploded structure of the structure shown in FIG. 2.

As shown in FIG. 2 and FIG. 3, the crown assembly 13 may include a crown part 14 and a fastening frame part 15. A part of the crown part 14 is exposed outside the case 11. A part of the crown part 14 is located inside the case 11. The fastening frame part 15 is disposed inside the case 11.

Figure 4:
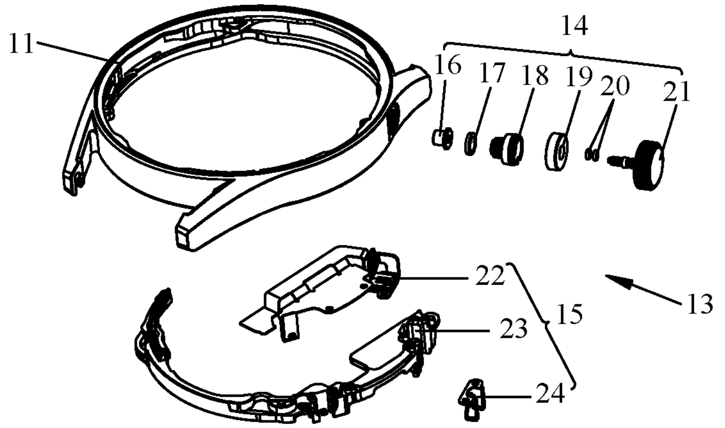
FIG. 4 is a schematic diagram of an exploded structure of the structure shown in FIG. 3.

FIG. 4 shows an exploded structure of the crown part 14 and the fastening frame part 15. As shown in FIG. 4, the crown part 14 may include a nut 16, a sealing ring 17 (which may be referred to as a second sealing ring), a button tube 18, a wear-resistant frame 19, a sealing ring 20 (which may be referred to as a first sealing ring), and a crown 21. The fastening frame part 15 may include a circuit board assembly 22, a fastening frame 23, and a spring piece 24 (where a spring piece 24 in an implementation is used as an example, and a spring piece 34 in another implementation is further described below). The following describes the foregoing components in detail.

Figure 5:
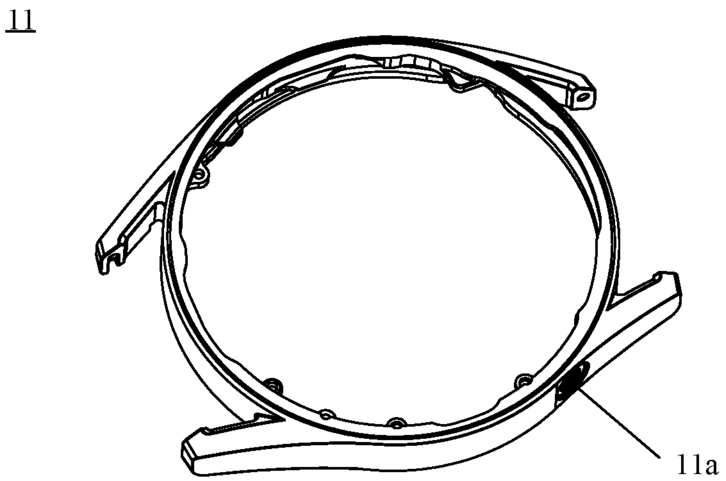
FIG. 5 is a schematic diagram of a structure of a case in FIG. 4.

As shown in FIG. 5, the case 11 may be approximately a circular ring structure. It may be understood that, based on a product requirement, the case 11 may be alternatively in another shape, for example, may be approximately a rectangular ring structure. A specific structure of the case 11 is not limited in this embodiment. An installation hole 11*a* may be disposed on a side wall of the case 11. The installation hole 11*a* is a threaded hole for installing the button tube 18 (which is further described below).

Figure 6:
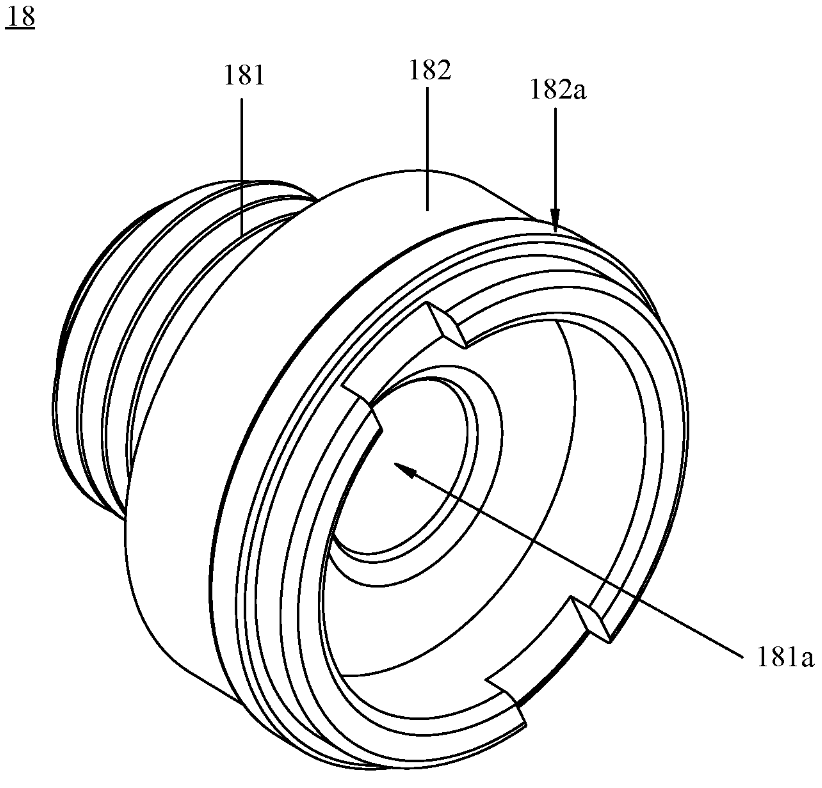
FIG. 6 is a schematic diagram of a three-dimensional structure of a button tube in FIG. 4.
Figure 7:
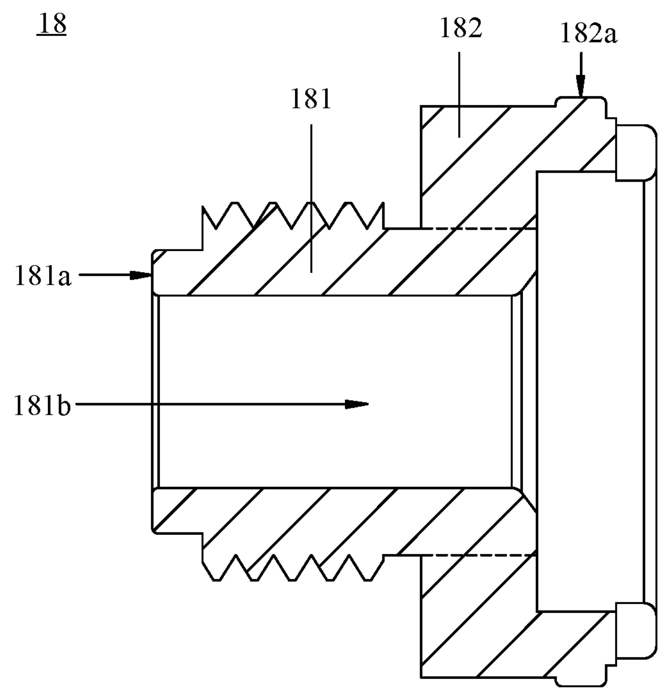
FIG. 7 is a schematic sectional view of a structure of the button tube in FIG. 6.

As shown in FIG. 6 and FIG. 7, the button tube 18 may be substantially a solid of revolution. The button tube 18 may include a connecting part 181 (which is also referred to as a first part) and a fitting part 182 (which is also referred to as a second part). The connecting part 181 and the fitting part 182 may be connected as a whole (where transverse dashed lines in FIG. 7 indicate boundaries between the connecting part 181 and the fitting part 182). The fitting part 182 is located at an end of the connecting part 181.

The connecting part 181 may be approximately circular tubular and has an inner cavity 181*b*. The inner cavity 181*b* may be a circular through hole. An external thread (a sawtooth structure in FIG. 7) may be disposed on an outer side surface of the connecting part 181. An interval exists between the external thread and the fitting part 182, and there is a specific interval between the external thread and an end surface 181*a* that is of the connecting part 181 and that faces away from the fitting part 182. The connecting part 181 can be threadedly connected to the installation hole 11*a* of the case 11 (which is further described below) via the external thread.

To enhance connection strength between the connecting part 181 and the case 11, and avoid loosening caused by reversely twisting the button tube 18 during long-term use of the crown assembly 13 and affecting a crown function, a surface that is of the external thread and that faces the end surface 181*a* may be welded with a surface (where two surfaces are substantially flush) that is of the installation hole 11*a* of the case 11 and that faces the end surface 181*a* (which is further described below). For example, two surfaces can be welded by using a spot welding process. In another embodiment, the connecting part 181 and the case 11 may not be welded based on a product requirement.

A wear-resistant lubricating layer may be disposed on the end surface 181*a* that is of the connecting part 181 and that faces away from the fitting part 182. Hardness of the wear-resistant lubricating layer may be greater than or equal to HV1000 (for example, the hardness may be HV1000, HV1200, HV1500, and the like). Roughness is less than or equal to Ra0.2 (for example, the roughness may be Ra0.2, Ra0.15, Ra0.1, and the like). The wear-resistant lubricating layer has good wear-resistant performance and lubricating performance. The wear-resistant lubricating layer includes but is not limited to a diamond-like carbon (DLC) thin film, a polytetrafluoroethylene (PTFE, commonly known as Teflon) layer, and the like. The end surface 181*a* may be in sliding contact with the nut 16 (which is further described below). The wear-resistant lubricating layer is designed to enhance wear resistance of the end surface 181*a* and reduce friction with the nut 16. In another embodiment, the wear-resistant lubricating layer may alternatively not be disposed on the end surface 181*a* based on a specific product design.

The fitting part 182 may be substantially a circular groove. The fitting part 182 surrounds outer periphery of the connecting part 181. A diameter of a groove opening of the fitting part 182 may be greater than a diameter of the inner cavity 181*b*. A fitting boss may be disposed on an outer side surface of a groove wall of the fitting part 182. The fitting boss surrounds the outer side surface. A top surface 182*a* of the fitting boss faces the wear-resistant frame 19 (which is further described below). To reduce friction, a wear-resistant lubricating layer may be disposed on the top surface 182*a*. In another embodiment, the wear-resistant lubricating layer may alternatively not be disposed on the top surface 182*a* based on a specific product design.

Figure 8:
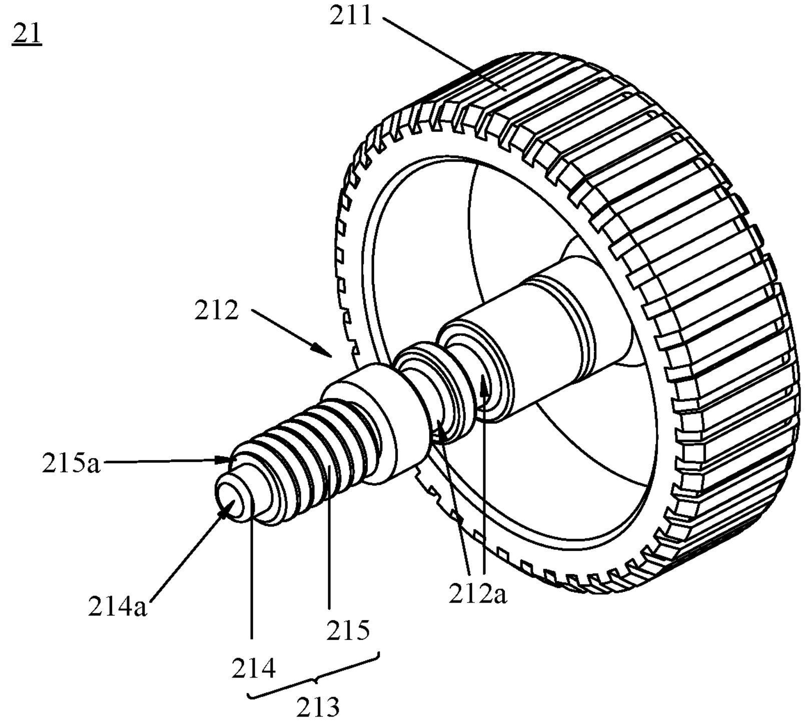
FIG. 8 is a schematic diagram of a three-dimensional structure of a crown in FIG. 4.
Figure 9:
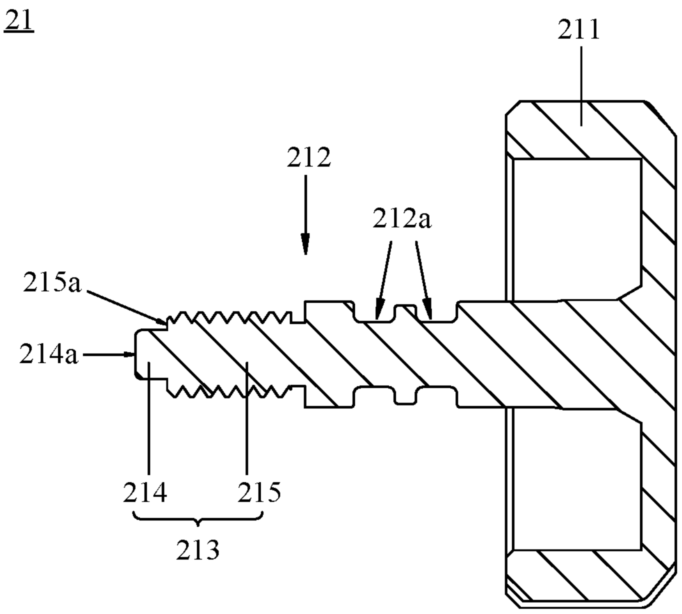
FIG. 9 is a schematic sectional view of a structure of the crown in FIG. 8.

As shown in FIG. 8 and FIG. 9, the crown 21 may generally be a solid of revolution. The crown 21 may include a crown cap 211 and a crown stem 212. The crown cap 211 is connected to an end of the crown stem 212. The crown cap 211 may be substantially in a circular groove structure. The crown stem 212 is protruded on a groove bottom surface of the crown cap 211, and is exposed from the crown cap 211.

The crown stem 212 may be substantially in a rod shape. An end that is of the crown stem 212 and that is away from the crown cap 211 may be referred to as a contact end 213. In this embodiment, the contact end 213 is an entity part on the crown stem 212. The contact end 213 may include a contact part 214 and a threaded part 215. The contact part 214 and the threaded part 215 may be integrated. The contact part 214 is an end that is of the crown stem 212 and that is away from the crown cap 211. The threaded part 215 is located between the contact part 214 and the crown cap 211. An outer diameter of the contact part 214 is smaller than an outer diameter of the threaded part 215 (where the outer diameter is a largest diameter). The contact part 214 has an end surface 214*a* facing away from the threaded part 215. The threaded part 215 has an external thread and an end surface 215*a*. The end surface 215*a* faces the contact part 214.

Several installation grooves 212*a*, for example, two installation grooves 212*a*, may be disposed on the crown stem 212. The installation groove 212*a* may be located between the threaded part 215 and the crown cap 211. The installation groove 212*a* may surround an axis of the crown stem 212. The installation groove 212*a* is configured to install the sealing ring 20.

With reference to FIG. 7 and FIG. 9, the crown 21 fits with the button tube 18. Specifically, the crown stem 212 may pass through the inner cavity 181*b* of the connecting part 181 of the button tube 18. The contact end 213 of the crown stem 212 and the crown cap 211 are respectively exposed at both axial ends of the button tube 18. The installation groove 212*a* is located in the inner cavity 181*b*. The foregoing fitting design may be further described below.

Figure 10:
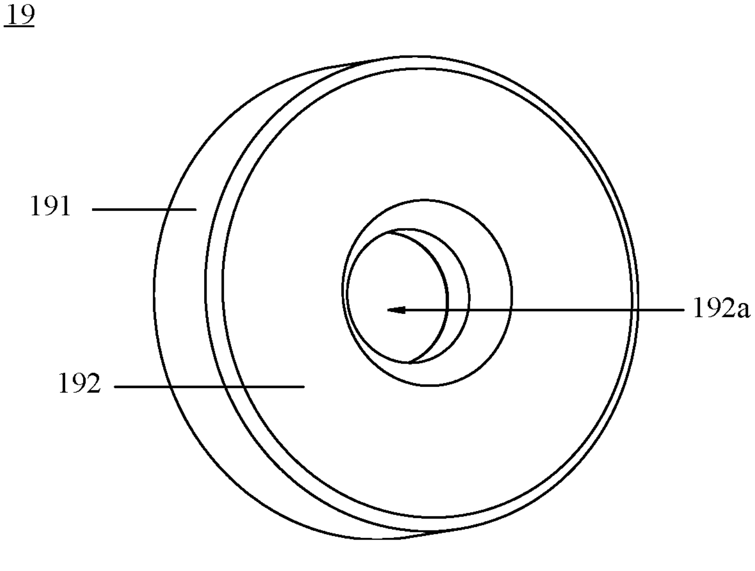
FIG. 10 is a schematic diagram of a three-dimensional structure of a wear-resistant frame in FIG. 4 in an angle of view.
Figure 11:
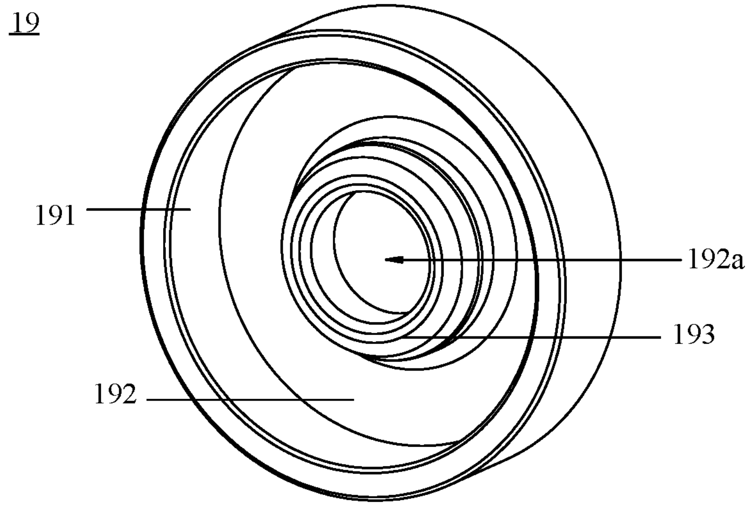
FIG. 11 is a schematic diagram of a three-dimensional structure of a wear-resistant frame in FIG. 4 in another angle of view.

As shown in FIG. 10 and FIG. 11, the wear-resistant frame 19 may be approximately a circular groove. The wear-resistant frame 19 may include a bottom wall 192 and a peripheral side wall 191. The peripheral side wall 191 is protruded at an edge of the bottom wall 192 and surrounds the bottom wall 192. In other words, the peripheral side wall 191 protrudes at a peripheral edge of the bottom wall 192. A central through hole 192*a* is disposed on the bottom wall 192. A surrounding wall 193 may be further protruded on the bottom wall 192. The surrounding wall 193 surrounds the central through hole 192*a*.

The wear-resistant frame 19 may be made of a material having high wear resistance. Material hardness of the wear-resistant frame 19 may be greater than or equal to HV1000 (for example, HV1000, HV1200, HV1500, HV1800, or the like). For example, the material of the wear-resistant frame 19 may be polyetheretherketone (PEEK). The PEEK material has high wear resistance and self-lubrication. Alternatively, the wear-resistant frame 19 may use another material, such as engineering plastic, specifically, such as polyoxymethylene (POM).

Figure 12:
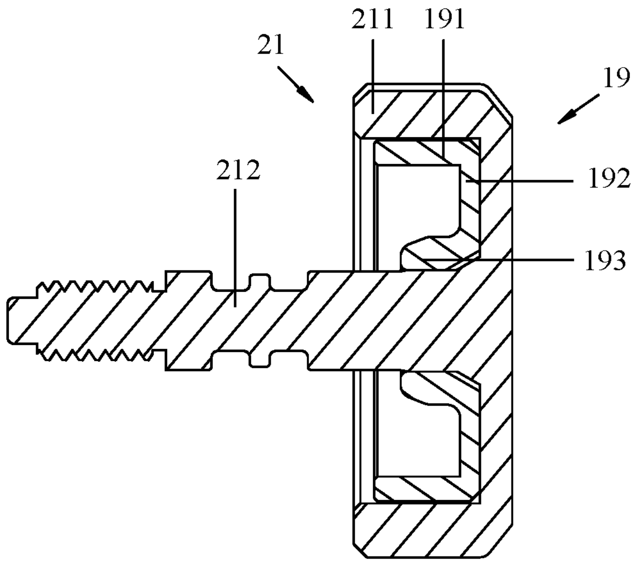
FIG. 12 is a schematic sectional view of an assembled structure of a crown and a wear-resistant frame in FIG. 4.

FIG. 12 is an assembled structure of the wear-resistant frame 19 and the crown 21. As shown in FIG. 12, the wear-resistant frame 19 may be fastened in the crown cap 211 of the crown 21. Both the bottom wall 192 and the peripheral side wall 191 of the wear-resistant frame 19 may be in contact with an inner wall of the crown cap 211. For example, the wear-resistant frame 19 may be in interference fit with the crown cap 211, so that the peripheral side wall 191 is in close contact with the inner wall of the crown cap 211 and is not easily loosened. The wear-resistant frame 19 may alternatively be fastened in the crown cap 211 in another manner. The crown stem 212 may pass through the central through hole 192*a* of the wear-resistant frame 19. The surrounding wall 193 may be in contact with the crown stem 212 to enhance connection strength between the wear-resistant frame 19 and the crown 21.

As described below, the wear-resistant frame 19 is designed to avoid friction and abnormal noise generated between the fitting part 182 of the button tube 18 and the peripheral side wall of the crown cap 211. In addition, after the wear-resistant frame 19 is installed, the crown 21 is not easy to shake along a radial direction of the crown 21. Therefore, assembly precision is improved, and user experience is ensured. In another embodiment, the wear-resistant frame 19 may not be disposed based on a specific product design.

Figure 13:
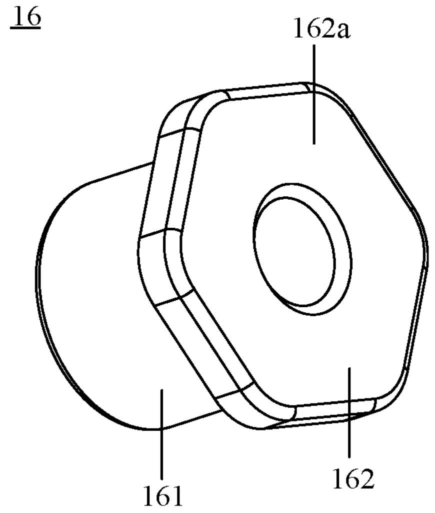
FIG. 13 is a schematic diagram of a three-dimensional structure of a nut in FIG. 4 in an angle of view.
Figure 14:
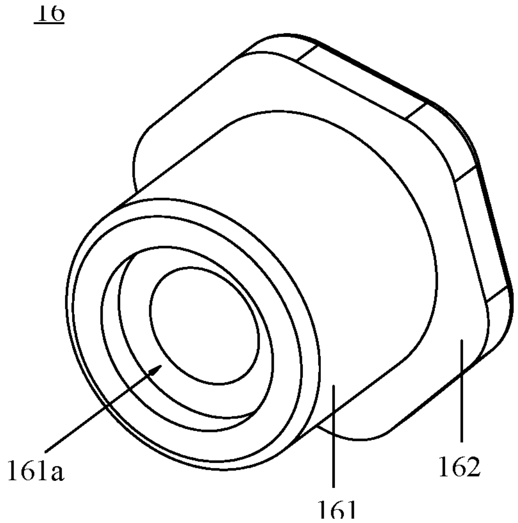
FIG. 14 is a schematic diagram of a three-dimensional structure of a nut in FIG. 4 in another angle of view.

As shown in FIG. 13 and FIG. 14, the nut 16 may include a threaded body 161 and a surrounding edge 162. The threaded body 161 may be a hollow cylinder. The surrounding edge 162 may be connected to an axial end of the threaded body 161. A counterbore may be disposed at an end that is of the threaded body 161 and that is away from the surrounding edge 162. The counterbore has a bottom surface 161*a*. A shape of the surrounding edge 162 may be approximately hexagonal. The surrounding edge 162 has a top surface 162*a* facing away from the threaded body 161. A wear-resistant lubricating layer may be disposed on the top surface 162*a*.

With reference to FIG. 9, the nut 16 may be threadedly connected to the threaded part 215 of the crown stem 212, and rotates with the crown stem 212. Descriptions are further provided below.

Figure 15:
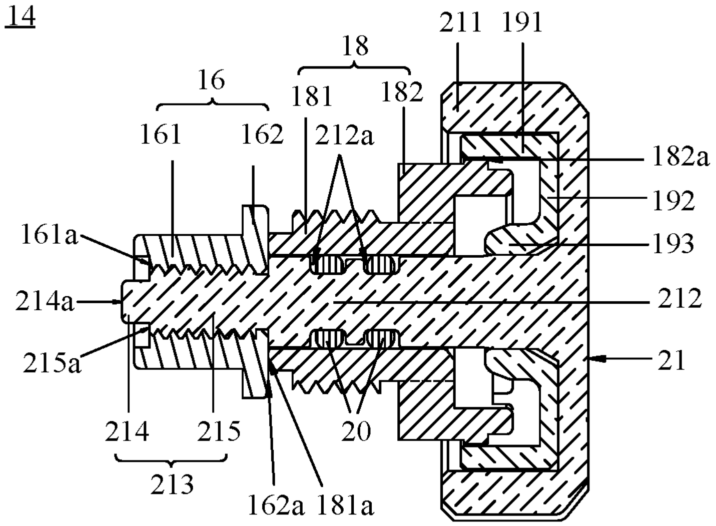
FIG. 15 is a schematic sectional view of an assembled structure of a crown part in FIG. 4.

FIG. 15 is a cross-sectional view showing assembly of each component in the crown part 14, and the sealing ring 17 is not shown. The sealing ring 17 is shown in a figure showing assembly of the crown part 14 and the case 11.

With reference to FIG. 7 and FIG. 15, the crown stem 212 may pass through the inner cavity 181*b* of the connecting part 181 of the button tube 18. The crown cap 211 and the contact end 213 of the crown stem 212 are respectively exposed on two axial sides of the button tube 18. The installation groove 212*a* on the crown stem 212 and the sealing ring 20 in the installation groove 212*a* are both located in the inner cavity 181*b* of the connecting part 181.

As shown in FIG. 15, a part of the fitting part 182 of the button tube 18 extends into the wear-resistant frame 19. The top surface 182*a* of the fitting part 182 may face the peripheral side wall 191 of the wear-resistant frame 19. A gap between the top surface 182*a* and the peripheral side wall 191 may be small. For example, the top surface 182*a* may be in contact with the peripheral side wall 191.

In this embodiment, a purpose of designing the wear-resistant frame 19 is described below. Based on a product structure design, the fitting part 182 is close to a peripheral side wall of the crown cap 211. Because a processing error or an assembly error, the fitting part 182 may be in contact with the peripheral side wall of the crown cap 211 and generate friction. The wear-resistant frame 19 is disposed between the fitting part 182 and the peripheral side wall of the crown cap 211, to avoid friction and abnormal noise generated between the fitting part 182 and the peripheral side wall of the crown cap 211. In addition, after the wear-resistant frame 19 is installed, the crown 21 is not easy to shake along a radial direction of the crown 21. Therefore, assembly precision is improved, and user experience is ensured.

In this embodiment, the crown 21 can drive the wear-resistant frame 19 to rotate relative to the button tube 18. The wear-resistant lubricating layer is disposed on the top surface 182*a* of the fitting part 182, to greatly reduce friction between the fitting part 182 and the wear-resistant frame 19, avoid abnormal noise generated when the crown 21 rotates, and avoid wear of the wear-resistant frame 19. It may be understood that in another product design, the wear-resistant lubricating layer may alternatively not be disposed on the top surface 182*a*.

As shown in FIG. 15, the nut 16 is threadedly connected to the contact end 213 of the crown stem 212. The top surface 162*a* of the surrounding edge 162 of the nut 16 can abut against the end surface 181*a* of the connecting part 181 of the button tube 18. Because an outer diameter of the surrounding edge 162 is greater than an outer diameter of the connecting part 181, the crown stem 212 cannot be detached from the button tube 18. The bottom surface 161*a* of the threaded body 161 of the nut 16 may be substantially flush with the end surface 215*a* of the threaded part 215 of the contact end 213 of the crown stem 212. The contact part 214 of the contact end 213 may extend beyond the nut 16 to be in contact with the spring piece 24 (which is described below).

In this embodiment, the nut 16 can rotate with the crown stem 212 relative to the button tube 18. When the nut 16 rotates, friction occurs between the top surface 162*a* of the nut 16 and the end surface 181*a* of the button tube 18. To reduce friction and avoid wear and abnormal noise, the wear-resistant lubricating layer may be disposed on the top surface 162*a* and/or the end surface 181*a*. The wear-resistant lubricating layer is located in a region in which the top surface 162*a* is in contact with the end surface 181*a*. It may be understood that in other product designs, the wear-resistant lubricating layer may not be disposed on the top surface 162*a* and/or the end surface 181*a*.

In this embodiment, to avoid loosening of the nut 16 in a rotation process, the bottom surface 161*a* of the nut 16 may be welded with the end surface 215*a* of the threaded part 215 of the crown stem 212. For example, a spot welding process may be used. It may be understood that another anti-loose design may alternatively be used, for example, an anti-loose gasket is used to avoid loosening.

Figure 16:
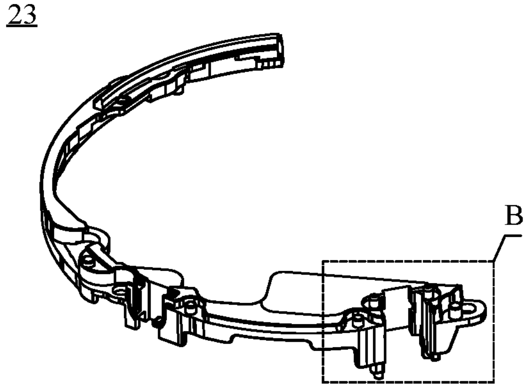
FIG. 16 is a schematic diagram of a three-dimensional structure of a fastening frame in FIG. 4.
Figure 17:
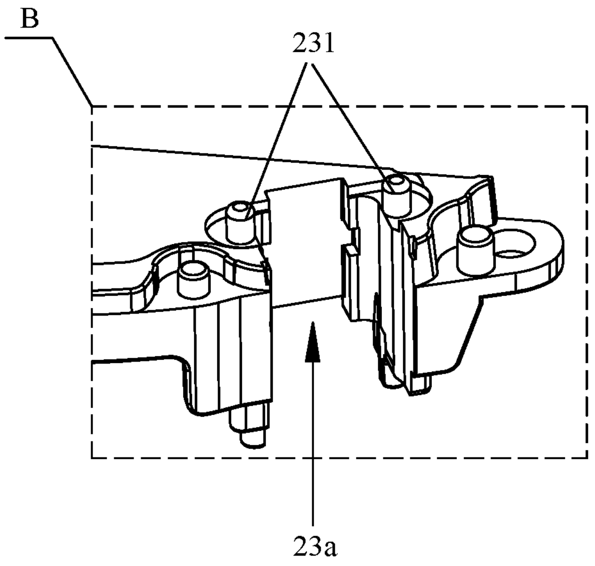
FIG. 17 is a schematic diagram of a partially enlarged structure of a position B in FIG. 16.

With reference to FIG. 5, FIG. 16, and FIG. 17, a shape of the fastening frame 23 may be adapted to a shape of the case 11. The fastening frame 23 may be disposed inside the case 11. As shown in FIG. 17, a wall of the fastening frame 23 may enclose installation space 23*a*. The fastening frame 23 may further have a heat stake 231. The heat stake 231 is adjacent to the installation space 23*a*. There may be, for example, two heat stakes 231 The installation space 23*a* is configured to accommodate a switch and a sensor on the circuit board assembly 22. The heat stake 231 is configured to position and fasten the spring piece 24 (which is further described below). A structure of the fastening frame 23 is not limited in this embodiment. A specific structure of the fastening frame 23 may be designed based on a product requirement.

In this embodiment, an antenna may be disposed on the fastening frame 23. The antenna may be integrally formed on the fastening frame 23 by using, for example, a laser direct structuring (LDS) technology. A specific type of the antenna is not limited. An electrocardiogram (ECG) module may be further disposed on the fastening frame 23. The ECG module is configured to detect electrocardiogram data of a user. In this design, more components can be integrated by using the structure of the fastening frame 23, and internal space of the wearable device 10 can be effectively used to expand functions of the wearable device 10 and improve user experience.

Figure 18:
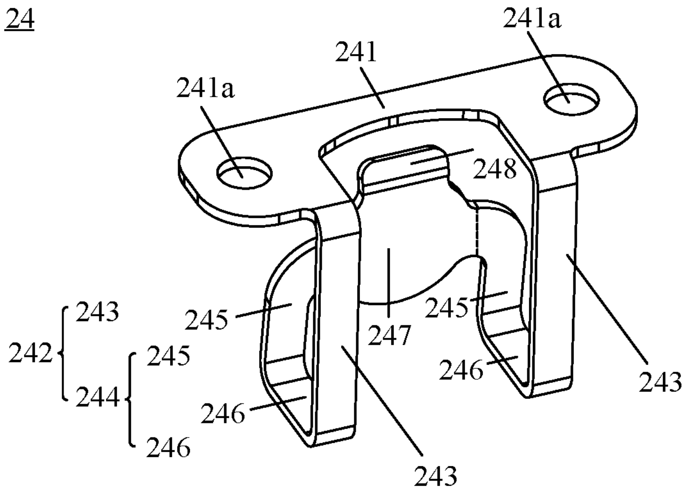
FIG. 18 is a schematic diagram of a three-dimensional structure of a spring piece of a fastening frame part in FIG. 4 in an angle of view.
Figure 19:
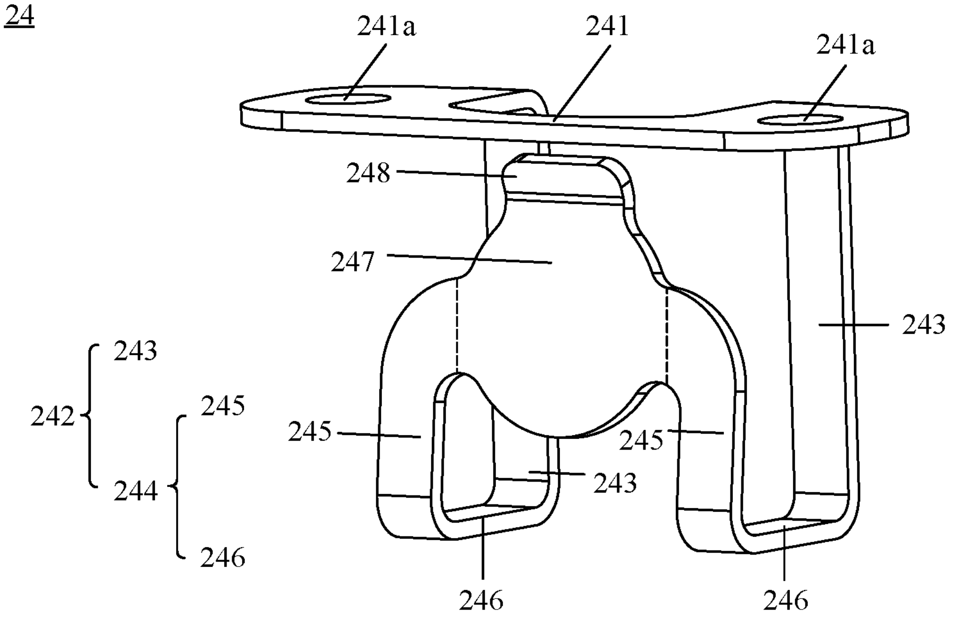
FIG. 19 is a schematic diagram of a three-dimensional structure of the spring piece in FIG. 18 in an angle of view.
Figure 20:
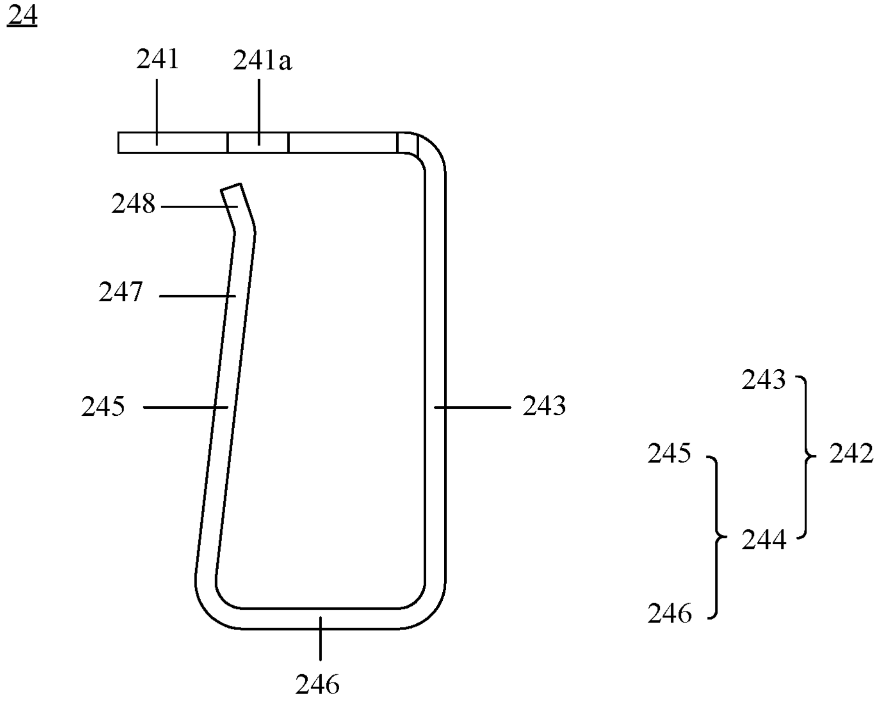
FIG. 20 is a schematic side view of a structure of the spring piece in FIG. 18.

FIG. 18 to FIG. 20 show a structure of the spring piece 24 in the implementation of this embodiment. The spring piece 24 may be an integral component and may include a second plate 241, an elastic arm 242, a first plate 247, and a third plate 248. A boundary between the elastic arm 242 and the first plate 247 is represented by using dashed lines in FIG. 18 and FIG. 19.

As shown in FIG. 18 and FIG. 19, the second plate 241 may be approximately flat. A positioning hole 241*a* may be disposed on the second plate 241. For example, there may be two positioning holes 241*a*. The second plate 241 is connected to the elastic arm 242.

As shown in FIG. 18 and FIG. 19, the elastic arm 242 is in a bent shape as a whole. For example, the elastic arm 242 may be approximately bent to form an inverted U-shaped structure. For example, the elastic arm 242 may include a first arm 243 and a second arm 244 that are connected.

As shown in FIG. 18 to FIG. 20, the first arm 243 may be flat. An end that is of the first arm 243 and that is away from the second arm 244 may be connected to the second plate 241 in a bending manner. The first arm 243 and the second plate 241 may form a bending angle. The bending angle may be approximately, for example, 90 degrees. Transition may be performed between the first arm 243 and the second plate 241 in a rounded corner. The second plate 241 is bent toward the first plate. The third plate 248, the first plate 247, and the second arm 244 may be all located inside the bending angle formed between the first arm 243 and the second plate 241.

As shown in FIG. 18 to FIG. 20, the second arm 244 may be bent. Parts that are of the second arm 244 and that are connected in a bending manner may not be coplanar. For example, the second arm 244 may include a first flat part 245 and a second flat part 246. Both the first flat part 245 and the second flat part 246 may be flat. The first flat part 245 and the second flat part 246 are connected in a bending manner. A bending angle between the first flat part 245 and the second flat part 246 may be less than 90 degrees, so that when the contact end of the crown stem presses the first plate, the elastic arm can generate elastic deformation.

Transition may be performed between the first flat part 245 and the second flat part 246 in a rounded corner.

As shown in FIG. 18 to FIG. 20, an end that is of the first flat part 245 and that is away from the second flat part 246 is connected to the first plate 247. The first flat part 245 may be substantially coplanar with the first plate 247. An end that is of the second flat part 246 and that is away from the first flat part 245 is connected to the first arm 243 in a bending manner. A bending angle between the second flat part 246 and the first arm 243 may be approximately 90 degrees. Transition may be performed between the second flat part 246 and the first arm 243 in a rounded corner.

In another implementation, the elastic arm is not formed by connecting several flat structures in the bending manner, but is bent as a whole, for example, may be arcuate. Actually, the elastic arm may be in any other appropriate shape, provided that sufficient elasticity can be provided.

Because the elastic arm 242 in this implementation has the foregoing bending design, the elastic arm 242 has a long arm, and can maintain good elasticity. This reduces a risk that the spring piece 24 is faulty caused by plastic deformation occurred in a long-term working process.

As shown in FIG. 18 and FIG. 19, in this implementation, there may be two elastic arms 242. An interval may exist between the two elastic arms 242. Structures of the two elastic arms 242 may be the same. A design of the double elastic arms enables the spring piece 24 to provide sufficient elasticity. In another embodiment, a quantity of elastic arms 242 may be determined based on a requirement, for example, one or at least two.

As shown in FIG. 18 and FIG. 19, the first plate 247 may be substantially flat. The first plate 247 may be connected between two second arms 244 of the two elastic arms 242. For example, the first plate 247 may be connected to the first flat part 245 of each second arm 244. The first plate 247 may be located between two first flat parts 245. The first plate 247 may be substantially coplanar with the two first flat parts 245. The first plate 247 and the first arm 243 are stacked at an interval. To be specific, a thickness direction of the first plate 247 and a thickness direction of the first arm 243 may be almost the same, and there is an interval in the thickness direction.

As shown in FIG. 19 and FIG. 20, the third plate 248 may be substantially flat. The third plate 248 is connected to a side that is of the first plate 247 and that is away from the first flat part 245, and forms a bending angle with the first plate 247. For example, in an angle of view in FIG. 20, the bending angle formed between the third plate 248 and the first plate 247 is an obtuse angle. In addition, the third plate 248 is inclined in a direction facing away from the first arm 243. The third plate 248 is located between the first plate 247 and the second plate 241. An interval exists between the third plate 248 and the second plate 241. It may also be considered that the third plate 248 is connected to a side that is of the first plate 247 and that is close to the second plate 241. The third plate 248 has a guiding function. This is described below.

Figure 21:
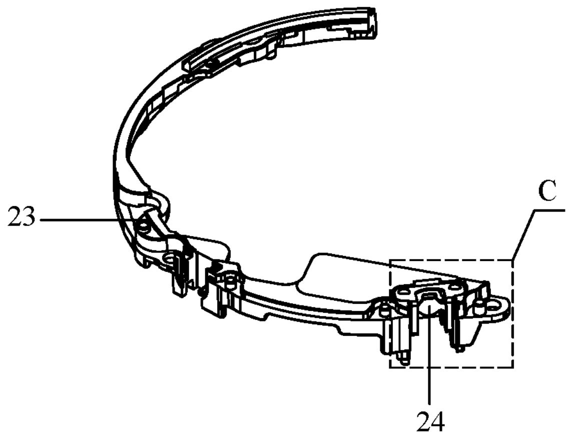
FIG. 21 is a schematic diagram of an assembled structure of the spring piece in FIG. 18 and the fastening frame in FIG. 16.
Figure 22:
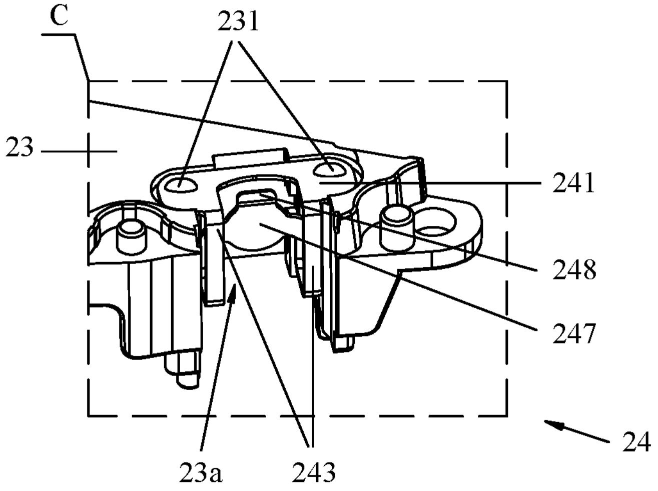
FIG. 22 is a schematic diagram of a partially enlarged structure of a position C in FIG. 21.

FIG. 21 and FIG. 22 show an assembled structure of the spring piece 24 and the fastening frame 23. FIG. 22 is a schematic diagram of a partially enlarged structure of a position C in FIG. 21. As shown in FIG. 22, the spring piece 24 may be fitted into the installation space 23*a* of the fastening frame 23. With reference to FIG. 18 and FIG. 22, the second plate 241 of the spring piece 24 may be positioned in the fastening frame 23. The positioning hole 241*a* on the second plate 241 may fit with the heat stake 231 on the fastening frame 23. The first plate 247 and the third plate 248 of the spring piece 24 may face an inner side of the installation space 23*a*. The first arm 243 opposite to the first plate 247 faces an outer side of the installation space 23*a*.

As shown in FIG. 22, after the spring piece 24 is positioned in the fastening frame 23, the heat stake 231 may be softened, thickened, and riveted to the positioning hole 241*a* by using a hot melt process. In this case, the heat stake 231 is fitted with an edge of the positioning hole 241*a*. Therefore, the spring piece 24 can be reliably fastened to the fastening frame 23. The hot melt connection design is simple and reliable, so that the fastening frame 23 can withstand long-term force of the spring piece 24. In addition, tolerance between the spring piece 24 and the fastening frame 23 can be effectively controlled.

In another embodiment, the spring piece can be assembled to the fastening frame in another manner, including but not limited to welding, bonding, threading, insert in-mold injection molding followed by spot welding, and the like.

Figure 23:
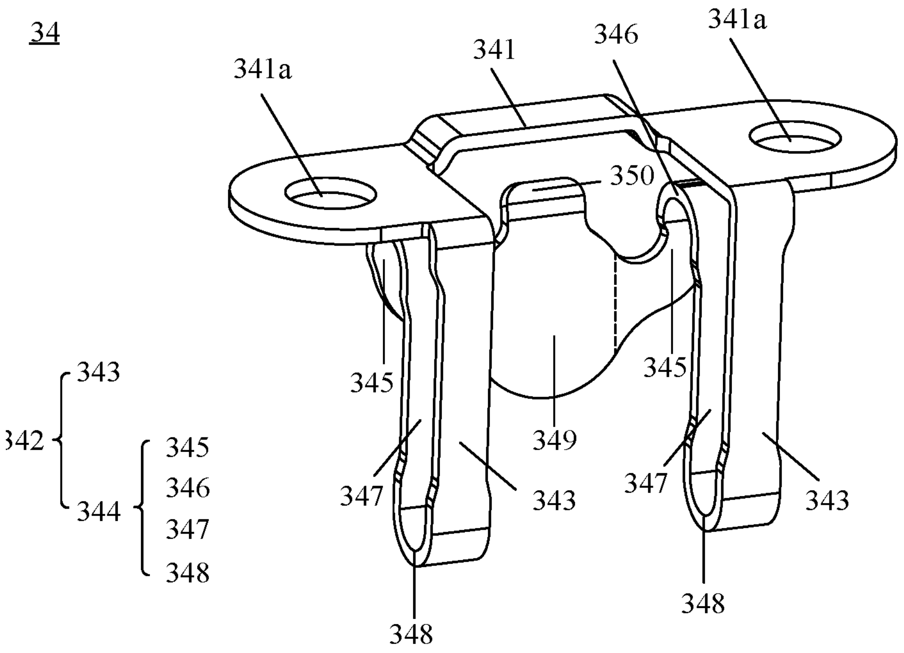
FIG. 23 is a schematic diagram of a three-dimensional structure of another spring piece of a fastening frame part in FIG. 4 in an angle of view.
Figure 24:
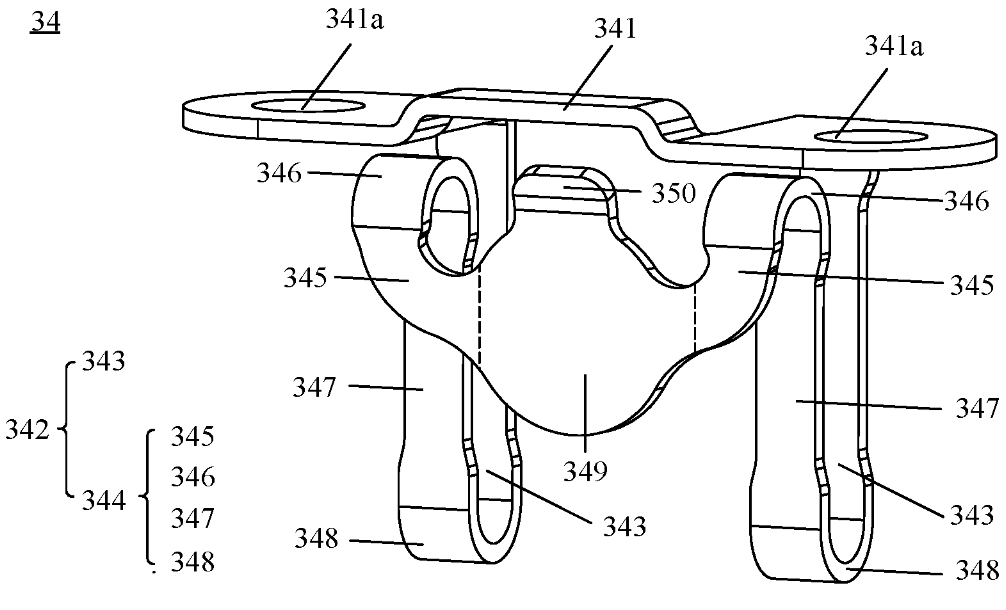
FIG. 24 is a schematic diagram of a three-dimensional structure of the spring piece in FIG. 23 in an angle of view.
Figure 25:
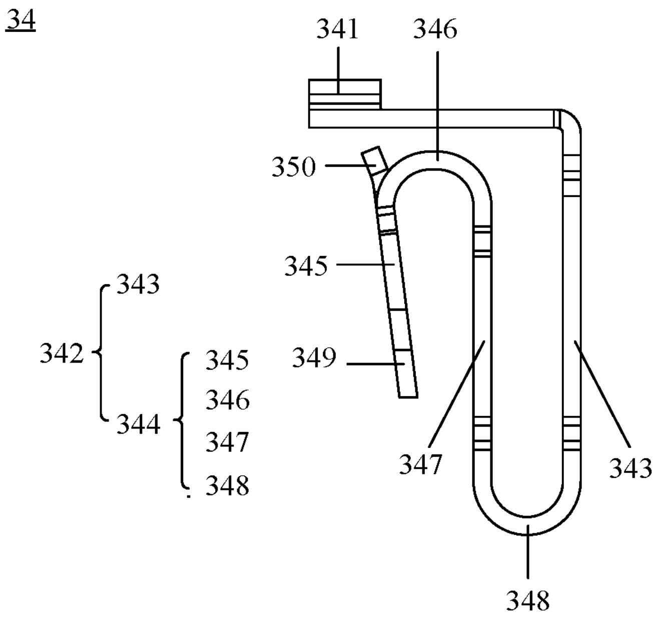
FIG. 25 is a schematic side view of a structure of the spring piece in FIG. 23.

FIG. 23 to FIG. 25 show a structure of the spring piece 34 in another implementation of this embodiment. The spring piece 34 may be an integral component and may include a second plate 341, an elastic arm 342, a first plate 349, and a third plate 350. A boundary between the elastic arm 342 and the first plate 349 is represented by using dashed lines in FIG. 23 and FIG. 24. A main difference between the spring piece 34 and the spring piece 24 lies in the elastic arm 342. Therefore, a design of the elastic arm 342 is described in detail below.

As shown in FIG. 23 to FIG. 25, different from the elastic arm 242 in the foregoing implementation, the elastic arm 342 in this implementation may be approximately bent to form an S-shaped structure. The elastic arm 342 may include a first arm 343 and a second arm 344 that are connected.

As shown in FIG. 23 to FIG. 25, the first arm 343 may be flat. An end that is of the first arm 343 and that is away from the second arm 344 may be connected to the second plate 341 in a bending manner. The first arm 343 and the second plate 341 may form a bending angle. The bending angle may be approximately, for example, 90 degrees. Transition may be performed between the first arm 343 and the second plate 341 in a rounded corner. The second plate 341 is bent toward the first plate. The third plate 350, the first plate 349, and the second arm 344 may be all located inside the bending angle formed between the first arm 343 and the second plate 341.

As shown in FIG. 23 to FIG. 25, the second arm 344 may be bent. Parts that are of the second arm 344 and that are connected in a bending manner may not be coplanar. For example, the second arm 344 may include a first flat part 345, a first bent plate part 346, a second flat part 347, and a second bent plate part 348.

Both the first flat part 345 and the second flat part 347 may be flat. Both the first bent plate part 346 and the second bent plate part 348 may be bent, for example, may be arcuate.

The first bent plate part 346 and the second bent plate part 348 are respectively located at two opposite ends of the second flat part 347. The first bent plate part 346 connects the first flat part 345 and the second flat part 347. An end that is of the first flat part 345 and that is away from the first bent plate part 346 is connected to the first plate 349. The first flat part 345 may be substantially coplanar with the first plate 349. The second bent plate part 348 is connected to the second flat part 347 and the first arm 343. The first flat part 345, the second flat part 347, and the first arm 343 are sequentially stacked at intervals. To be specific, a thickness direction of the first flat part 345, a thickness direction of the second flat part 347, and a thickness direction of the first arm 343 may be almost the same, and there is an interval in the thickness direction.

Similarly, the elastic arm 342 in this implementation has a long arm, and can maintain good elasticity. This reduces a risk that the spring piece 34 is faulty caused by plastic deformation occurred in a long-term working process. The spring piece 34 may also have double elastic arms capable of providing sufficient elasticity. The spring piece 34 in this implementation can meet a specific product requirement.

Figure 26:
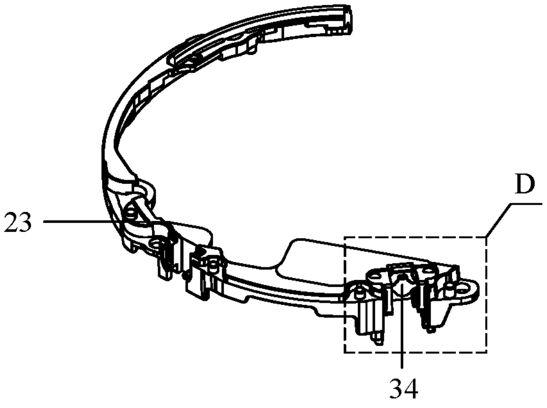
FIG. 26 is a schematic diagram of an assembled structure of the spring piece in FIG. 23 and the fastening frame in FIG. 16.
Figure 27:
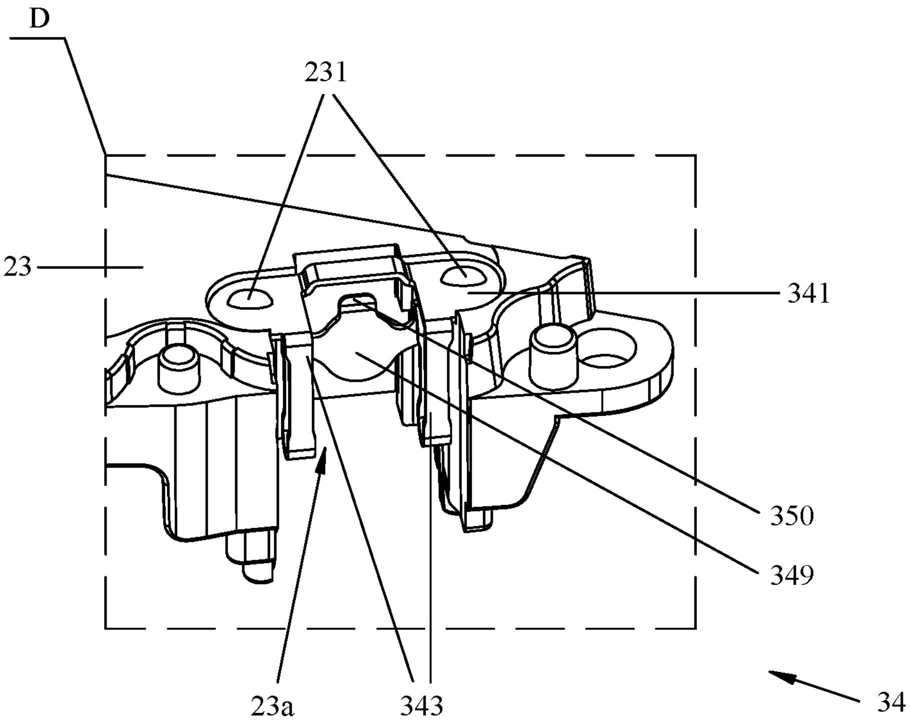
FIG. 27 is a schematic diagram of a partially enlarged structure of a position D in FIG. 26.

FIG. 26 and FIG. 27 show an assembled structure of the spring piece 34 and the fastening frame 23. FIG. 27 is a schematic diagram of a partially enlarged structure of a position D in FIG. 26. As shown in FIG. 27, the spring piece 34 may be fitted into the installation space 23*a* of the fastening frame 23. With reference to FIG. 18 and FIG. 27, the second plate 341 of the spring piece 34 may be positioned in the fastening frame 23. The positioning hole 341*a* on the second plate 341 may fit with the heat stake 231 on the fastening frame 23. The first plate 349 and the third plate 350 of the spring piece 34 may face an inner side of the installation space 23*a*. The first arm 343 opposite to the first plate 349 faces an outer side of the installation space 23*a*.

The spring piece 24 is still used as an example to describe the solutions of this embodiment.

Figure 28:
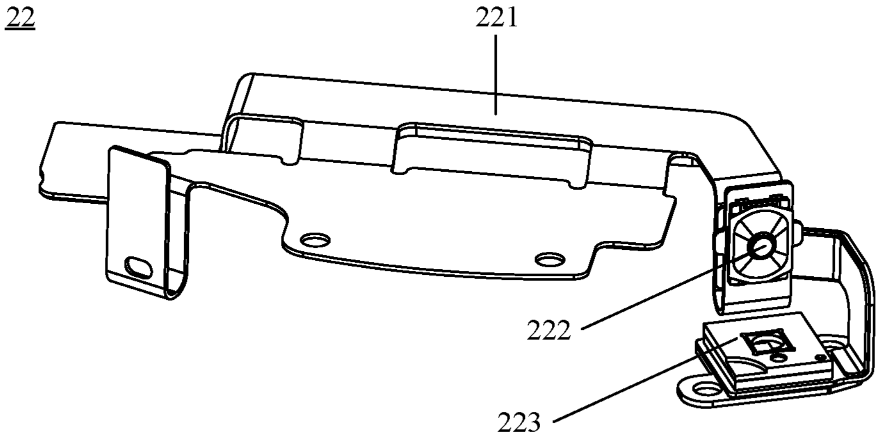
FIG. 28 is a schematic diagram of a three-dimensional structure of a circuit board assembly in FIG. 4.

FIG. 28 is a schematic diagram of a structure of the circuit board assembly 22. As shown in FIG. 28, the circuit board assembly 22 may include a circuit board 221, and a switch 222 and a sensor 223 that are disposed on the circuit board 221.

The circuit board 221 may be a flexible printed circuit (FPC).

The switch 222 may be welded on the circuit board 221. The switch 222 is an electronic switch element that can be closed and turned on under a specific pressure. The switch is turned off when the pressure is released. For example, the switch may be a dome switch. A circuit may be connected and disconnected inside the dome switch by using a force change of a metal spring piece. The sensor 223 may be welded on the circuit board 221.

The sensor 223 may be an optical sensor, and may emit invisible light, receive the reflected invisible light, and sense an electrical signal. The sensor 223 is configured to detect a rotation speed and a rotation angle of the nut 16 (which are described below). In another embodiment, the sensor 223 may also be another sensor that can achieve the foregoing purposes.

In this embodiment of this application, the sensor 223 and the nut 16 are designed separately. A nut integrated with a sensor or a grating does not need to be specially designed and manufactured (where the nut has a complex structure), so that costs can be reduced and process difficulty can be reduced.

Figure 29:
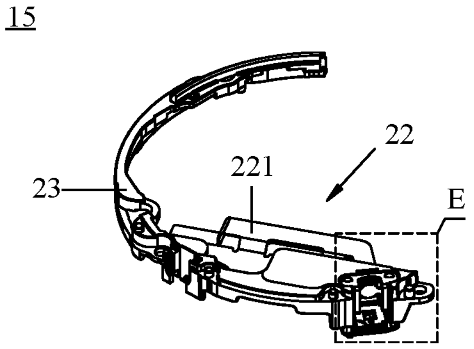
FIG. 29 is a schematic diagram of a three-dimensional structure of a fastening frame part in FIG. 3.
Figure 30:
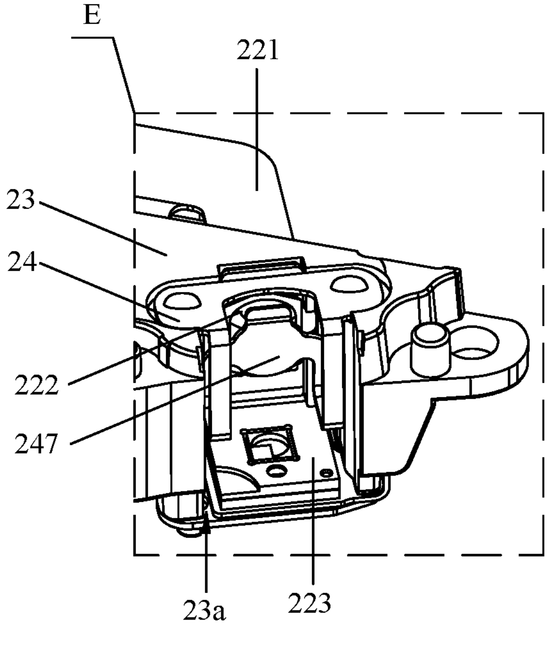
FIG. 30 is a schematic diagram of a partially enlarged structure of a position E in FIG. 29.

FIG. 29 and FIG. 30 are schematic diagrams of an assembled structure of the circuit board assembly 22, the fastening frame 23, and the spring piece 24, and are also schematic diagrams of a structure of the fastening frame part 15. FIG. 30 is a schematic diagram of a partially enlarged structure of a position E in FIG. 29. As shown in FIG. 29 and FIG. 30, the circuit board assembly 22 may be disposed on the fastening frame 23. The switch 222 and the sensor 223 may be located in the installation space 23*a* of the fastening frame 23. The switch 222 may be directly opposite to the first plate 247 of the spring piece 24. The switch 222 may remain in contact with the first plate 247, or a gap exists between the switch 222 and the first plate 247. The switch 222 is closer to an inner wall of the installation space 23*a*. The first plate 247 is relatively far away from the inner wall. For example, in an angle of view in FIG. 30, the first plate 247 is in front of the switch 222. The first plate 247 covers a part of the switch 222.

Figure 31:
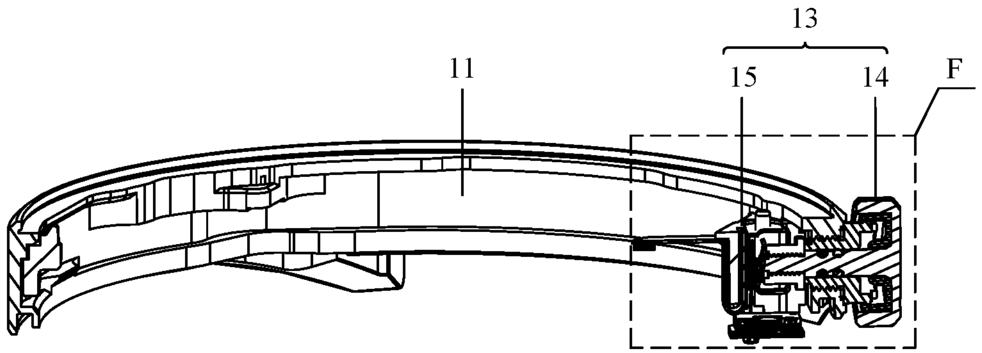
FIG. 31 is a schematic sectional view of an A-A structure of the structure shown in FIG. 2.
Figure 32:
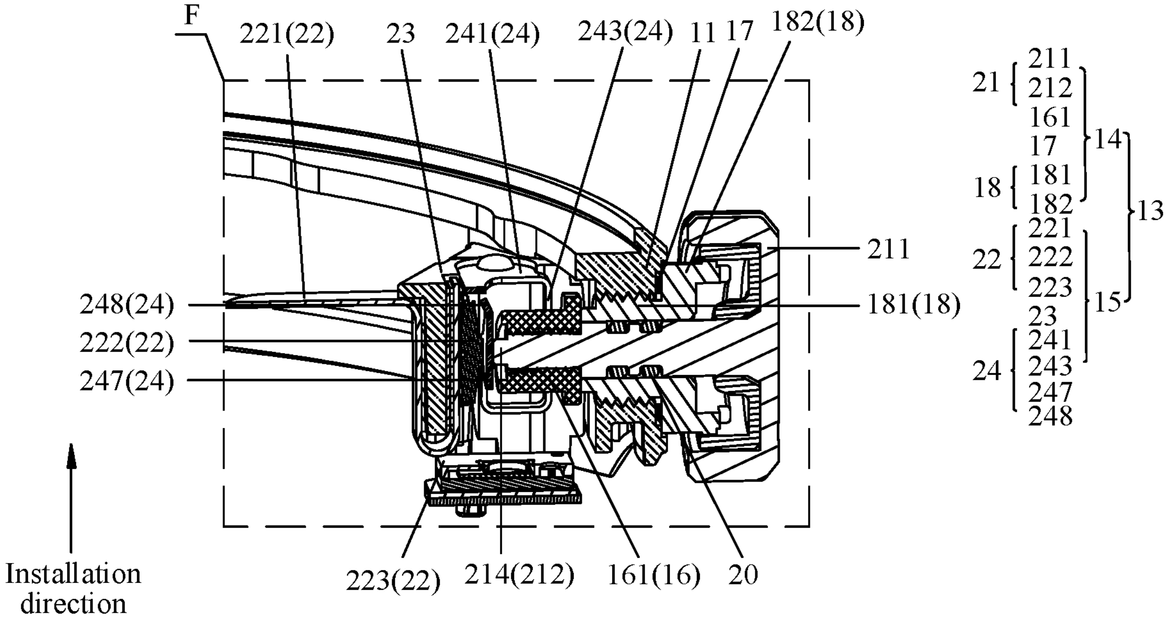
FIG. 32 is a schematic diagram of a partially enlarged structure of a position F in FIG. 31.

FIG. 31 is a schematic sectional view of an A-A structure of the structure shown in FIG. 2. FIG. 31 may show an assembled structure of the crown assembly 13 and the case 11. FIG. 32 is a schematic diagram of a partially enlarged structure of a position F in FIG. 31. With reference to FIG. 15, FIG. 29, and FIG. 31, the crown part 14 and the fastening frame part 15 may be separately assembled first. Then, the crown part 14 and the fastening frame part 15 are separately disposed on the case 11. Descriptions are provided below.

As shown in FIG. 32, the crown part 14 of the crown assembly 13 may be first disposed on the case 11 from an outer side to an inner side of the case 11. The connecting part 181 of the button tube 18 is threadedly connected to the installation hole 11*a* of the case 11, so that the button tube 18 is fastened to the case 11. The design in which the button tube 18 is threadedly connected to the case 11 has high assembly precision and low costs. The sealing ring 17 is disposed between the fitting part 182 of the button tube 18 and the case 11, to seal a gap between the fitting part 182 and the case 11, to avoid entering of external water vapor and dust. The crown cap 211 of the crown 21 is exposed on the outer side of the case 11. There is a specific interval between the crown cap 211 and the outer surface of the case 11. A part (for example, the contact part 214) of the crown stem 212 of the crown 21 is located inside the case 11.

As shown in FIG. 32, then, the fastening frame part 15 of the crown assembly 13 may be installed from the inner side of the case 11 along an installation direction indicated by an arrow (for example, an upward direction in an angle of view in FIG. 32) to the inner side of the case 11. The fastening frame 23 is fastened to the inner wall of the case 11. With reference to FIG. 32, FIG. 15, and FIG. 18, the crown stem 212 may penetrate into the interval between the two elastic arms 242 of the spring piece 24. The end surface 214*a* of the contact part 214 of the crown stem 212 may be in contact with the first plate 247 of the spring piece 24. The first plate 247 and the first arm 243 of the spring piece 24 are respectively located on two opposite sides of the end surface 214*a*. The first plate 247 of the spring piece 24 is located between the switch 222 and the contact part 214 of the crown stem 212.

In a process of positioning the spring piece 24 in the installation position along the installation direction, because the third plate 248 of the spring piece 24 is inclined in a direction facing away from the contact part 214, movement of the spring piece 24 can be guided. This reduces a risk that the spring piece 24 is stuck by the contact part 214, and ensures that the spring piece 24 can smoothly fit with the contact part 214.

The sensor 223 and the threaded body 161 of the nut 16 may be disposed at an interval (for example, the sensor 223 may be located at a specific distance below the threaded body 161 in the angle of view in FIG. 32).

The crown 21 in the crown assembly 13 can move back and forth along a straight line and rotate.

As shown in FIG. 32, when the user presses the crown cap 211 along the axis of the crown cap 211, the contact part 214 of the crown stem 212 pushes the first plate 247 of the spring piece 24, so that the first plate 247 is away from the first arm 243, and presses the switch 222. At the same time, the elastic arm of the spring piece 24 generates elastic deformation. When the user releases the pressing, the elastic arm bounces, so that the first plate 247 no longer presses the switch 222, and pushes the contact part 214 reversely. Therefore, the crown cap 211 returns to the original position. It can be learned that when the user presses the crown cap 211, the spring piece 24 extends.

It is easy to understand that the crown assembly 13 in this embodiment provides pressing resilience via the spring piece 24. Because the spring piece 24 is located inside the case 11, and is far away from the crown cap 211, it is difficult for external water vapor and dust to enter the spring piece 24 through a gap between the crown cap 211 and the case 11. In addition, because the sealing ring 17 and the sealing ring 20 are designed, a traveling path of the external water vapor and dust can be further blocked. Therefore, in the solutions in this embodiment, external erosion on the spring piece 24 can be avoided, to ensure reliability of the spring piece 24.

In addition, the elastic arm 242 of the spring piece 24 having the foregoing structural design and assembly design is long. The spring piece 24 can provide sufficient pressing resilience to the crown 21, and can further ensure a pressing feeling of the crown 21.

In addition, in this embodiment, the crown stem 212 of the crown 21 and the button tube 18 have a large fitting length, and the button tube 18 has a significant limiting effect on the crown stem 212, so that the crown 21 is not easy to shake.

In a processing process of the spring piece 24 in this embodiment, a residual stress direction of the elastic arm points to the crown stem 212. It can be learned from the foregoing descriptions that a direction of pressing force applied by the user to the crown cap 211 is opposite to the residual stress direction of the elastic arm. Therefore, the pressing force of the user can counteract a part of the residual stress of the elastic arm. This improves fatigue resistance of the spring piece 24 compared with a conventional spring piece. Therefore, the spring piece 24 of this embodiment has greater fatigue resistance, can perform more elastic deformation, and has a longer service life. An actual test verifies that, compared with the conventional spring piece, the spring piece 24 in this embodiment has higher reliability and longer service life.

As shown in FIG. 32, when the user rotates the crown cap 211, the crown stem 212 rotates in the button tube 18, and the nut 16 also rotates with the crown stem 212. Different regions of an outer peripheral surface of the threaded body 161 of the nut 16 have different surface micro-shapes. When the different regions of the threaded body 161 face the sensor 223, parameters of invisible light reflected by the threaded body 161 to the sensor 223 are different. Therefore, electrical signals sensed by the sensor 223 are different. The rotation speed and the rotation angle of the nut 16 may be detected based on the different electrical signals sensed by the sensor 223.

It is easy to understand that, the crown assembly 13 and the crown 21 in this embodiment can smoothly rotate forward and reverse, and friction damping of forward rotation is consistent with that of reverse rotation. This avoids abnormalities such as crown jamming, a large deviation of forward rotation/reverse rotation damping, and abnormal noise in a conventional solution of using a spring. Therefore, user experience is greatly improved.

In addition, the conventional solution is difficult to perform material management and control on the spring, and a spiral structure of the spring causes the spring to be easily crossed and entangled. However, a structure and feature of the spring piece 24 used in this embodiment can ensure that the spring piece 24 is not easily entangled, to facilitate material management and control. In addition, a size of the spring is difficult to be detected. This does not facilitate control on quality of incoming materials. On the contrary, a size detection of the spring piece 24 is easy to be detected. This facilitates control on quality of incoming materials.

A structure and movement fitting of the crown assembly 13 are described in detail above. A scenario in which the user interacts with the wearable device 10 by pressing and rotating the crown assembly 13 is listed below.

When the user presses the crown cap 211, the switch 222 is turned on. In this case, the wearable device 10 may perform a corresponding operation, for example, turned on or off the screen 12, display an interface or a function option, mute an incoming call, or mute an alarm clock. When the user rotates the crown cap 211, the wearable device 10 may perform a corresponding operation based on a rotation status of the threaded body 161 sensed by the sensor 223. For example, the screen 12 may display animation such as menu sliding or switching, content zooming, and the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A crown assembly configured to be disposed in a wearable device to implement a crown function, wherein the wearable device comprises a case, wherein:

the crown assembly comprises a button tube, a crown, a spring piece, a switch, and a fastening frame;

the button tube and the fastening frame are configured to be disposed in the case;

the crown comprises a crown cap and a crown stem that are connected, wherein the crown stem has a contact end away from the crown cap, the crown stem passes through an inner cavity of the button tube, the crown stem is rotatably connected to a cavity wall of the inner cavity and is operable to move in the inner cavity along an axis of the crown stem, and the contact end and the crown cap are exposed at two opposite ends of the button tube;

the spring piece comprises a first plate, an elastic arm, and a second plate, wherein two ends of the elastic arm are respectively connected to the first plate and the second plate, the second plate is configured to dispose the spring piece on the fastening frame, wherein one end of the elastic arm that is connected to the second plate and the other end of the elastic arm that is connected to the first plate are respectively located on two sides of an end surface of the contact end, one side of the first plate is close to the switch, and the other side of the first plate is in contact with the end surface of the contact end;

the switch is disposed on the fastening frame and is located on a side of the first plate that faces away from the contact end; and the crown assembly is operable such that when pressure is exerted on the crown cap, the crown stem is operable to move along the axis and push the first plate away from the end of the elastic arm that is connected to the second plate, to enable the first plate to press the switch, wherein the elastic arm is operable to generate elastic deformation, and when the pressure on the crown cap is released, the first plate is operable to push the crown stem away from the switch under elasticity of the elastic arm.

2. The crown assembly according to claim 1, wherein: the spring piece comprises two elastic arms, wherein an interval exists between the two elastic arms, and the interval is for the contact end to pass through, to enable the end surface of the contact end to be in contact with the first plate;

the first plate is connected between the two elastic arms; and the second plate is connected to the two elastic arms.

3. The crown assembly according to claim 1, wherein the second plate and the elastic arm form a bending angle, and the first plate is located in the bending angle.

4. The crown assembly according to claim 1, wherein the second plate has a positioning hole, the fastening frame has a heat stake, and the heat stake passes through the positioning hole and is clamped with an edge of the positioning hole.

5. The crown assembly according to claim 1, wherein the spring piece comprises a third plate, the third plate is connected to an end of the first plate that is away from the elastic arm, the third plate and the first plate form a bending angle, and the third plate is inclined in a direction facing away from the contact end.

6. The crown assembly according to claim 1, wherein: the elastic arm comprises a first arm and a second arm, wherein two ends of the first arm are respectively connected to the second plate and the second arm, and two ends of the second arm are respectively connected to the first arm and the first plate; and the first arm and the first plate are stacked at an interval, and the first arm and the first plate are respectively located on the two sides of the end surface of the contact end.

7. The crown assembly according to claim 6, wherein the second arm is bent, and parts that are of the second arm and that are connected in a bending manner are not coplanar.

8. The crown assembly according to claim 7, wherein the second arm comprises a first flat part and a second flat part, the first flat part is connected to the second flat part in a bending manner, an end of the first flat part that is away from the second flat part is connected to the first plate, and an end of the second flat part that is away from the first flat part is connected to the first arm in a bending manner.

9. The crown assembly according to claim 7, wherein: the second arm comprises a first flat part, a first bent plate part, a second flat part, and a second bent plate part, the first flat part, the second flat part, and the first arm are sequentially stacked at intervals, the first bent plate part and the second bent plate part are respectively located at two opposite ends of the second flat part, the first bent plate part is connected to the first flat part and the second flat part, an end of the first flat part that is away from the first bent plate part is connected to the first plate, and the second bent plate part is connected to the second flat part and the first arm.

10. The crown assembly according to claim 1, wherein: the crown assembly comprises a nut, wherein the nut is threadedly connected to the contact end of the crown stem, and an end part of the contact end is exposed from the nut; and the nut is in contact with an end surface of the button tube, and an outer diameter of an end of the nut that is in contact with the button tube is greater than an outer diameter of an end of the button tube that is in contact with the nut, to prevent the crown stem from being detached from the button tube.

11. The crown assembly according to claim 10, wherein: the contact end comprises a contact part and a threaded part that are connected, wherein an outer diameter of the contact part is smaller than an outer diameter of the threaded part;

the contact part is in contact with the first plate;

the threaded part is threadedly connected to the nut; and an end surface of the nut that is close to the contact part is welded with an end surface of the threaded part that is close to the contact part.

12. The crown assembly according to claim 10, wherein: a wear-resistant lubricating layer is disposed on an end surface of the end of the nut that is in contact with the button tube; and/or a wear-resistant lubricating layer is disposed on an end surface of the end of the button tube that is in contact with the nut, wherein hardness of the wear-resistant lubricating layer is greater than or equal to HV1000, and roughness is less than or equal to Ra0.2.

13. The crown assembly according to claim 10, wherein the crown assembly comprises a sensor, the sensor and the nut are disposed at an interval, and the sensor is configured to detect a rotation direction and a rotation angle of the nut.

14. The crown assembly according to claim 1, wherein: the crown assembly comprises a wear-resistant frame, wherein material hardness of the wear-resistant frame is greater than or equal to HV1000;

the wear-resistant frame comprises a bottom wall and a peripheral side wall that are connected, the peripheral side wall is protruded at and the crown stem passes through a central through hole, both the bottom wall and the peripheral side wall are fastened to an inner wall of the crown cap, and the peripheral side wall is located between the button tube and the inner wall of the crown cap.

15. The crown assembly according to claim 14, wherein: the button tube comprises a connecting part and a fitting part, wherein the connecting part has the inner cavity, and the connecting part is configured to be fastened to the case;

the fitting part is connected to outer periphery of the connecting part in a surrounding manner and is located at an end of the connecting part that is away from a nut; and the peripheral side wall of the wear-resistant frame is located between the fitting part and the inner wall of the crown cap.

16. The crown assembly according to claim 15, wherein a wear-resistant lubricating layer is disposed on a surface of the fitting part that faces the peripheral side wall, wherein hardness of the wear-resistant lubricating layer is greater than or equal to HV1000, and roughness is less than or equal to Ra0.2.

17. The crown assembly according to claim 1, wherein: an installation groove is disposed on a surface of a part of the crown stem that is located in the inner cavity, wherein the installation groove surrounds the axis of the crown stem; and the crown assembly comprises a first sealing ring disposed in the installation groove and in contact with an inner wall of the inner cavity.

18. The crown assembly according to claim 1, wherein: a wear-resistant lubricating layer is disposed on the end surface of the contact end; and/or a wear-resistant lubricating layer is disposed on a surface of the first plate that is in contact with the contact end, wherein hardness of the wear-resistant lubricating layer is greater than or equal to HV1000, and roughness is less than or equal to Ra0.2.

19. A wearable device, comprising:

a case and a crown assembly, wherein the crown assembly is configured to implement a crown function;

the crown assembly comprises a button tube, a crown, a spring piece, a switch, and a fastening frame;

the button tube and the fastening frame are configured to be disposed in the case;

the crown comprises a crown cap and a crown stem that are connected, wherein the crown stem has a contact end away from the crown cap, the crown stem passes through an inner cavity of the button tube, the crown stem is rotatably connected to a cavity wall of the inner cavity and is operable to move in the inner cavity along an axis of the crown stem, and the contact end and the crown cap are exposed at two opposite ends of the button tube;

the spring piece comprises a first plate, an elastic arm, and a second plate, wherein two ends of the elastic arm are respectively connected to the first plate and the second plate, the second plate is configured to dispose the spring piece on the fastening frame, one end of the elastic arm that is connected to the second plate and the other end of the elastic arm that is connected to the first plate are respectively located on two sides of an end surface of the contact end, one side of the first plate is close to the switch, and the other side of the first plate is in contact with the end surface of the contact end;

the switch is disposed on the fastening frame and is located on a side of the first plate that faces away from the contact end; and the crown assembly is operable such that when pressure is exerted on the crown cap, the crown stem is operable to move along the axis and push the first plate away from the end of the elastic arm that is connected to the second plate, to enable the first plate to press the switch, wherein the elastic arm is operable to generate elastic deformation, and when the pressure on the crown cap is released, the first plate is operable to push the crown stem away from the switch under elasticity of the elastic arm; and the case has an installation hole to communicate with an inner side and an outer side of the case; and the button tube is fastened to an inner wall of the installation hole, both a part of the button tube and the crown cap are located outside the case, and both the spring piece and the switch are located in the case.

20. The wearable device according to claim 19, wherein the installation hole is a threaded hole; and the button tube is threadedly connected to the installation hole, and an end surface of the button tube that faces the spring piece is welded with an end surface of the installation hole that faces the spring piece.

* * * * *